US012017192B1

(12) United States Patent
Chen et al.

(10) Patent No.: US 12,017,192 B1
(45) Date of Patent: Jun. 25, 2024

(54) CARBONATION MIXING NOZZLES

(71) Applicant: SharkNinja Operating LLC, Needham, MA (US)

(72) Inventors: Ryan Chen, Shenzhen (CN); Ken Lin, Shenzhen (CN); Tie He Yang, Shenzhen (CN); Jack Richardson, Yorkshire (GB)

(73) Assignee: SharkNinja Operating LLC, Needham, MA (US)

(*) Notice: Subject to any disclaimer, the term of this patent is extended or adjusted under 35 U.S.C. 154(b) by 0 days.

(21) Appl. No.: 18/365,739

(22) Filed: Aug. 4, 2023

Related U.S. Application Data

(63) Continuation of application No. PCT/CN2023/100571, filed on Jun. 16, 2023.

(51) Int. Cl.
*B01F 23/23* (2022.01)
*B01F 23/231* (2022.01)
*B01F 23/236* (2022.01)
*B01F 23/237* (2022.01)
*B01F 25/20* (2022.01)

(52) U.S. Cl.
CPC .......... *B01F 25/28* (2022.01); *B01F 23/2311* (2022.01); *B01F 23/236* (2022.01); *B01F 23/2362* (2022.01); *B01F 23/237621* (2022.01)

(58) Field of Classification Search
CPC .... B01F 23/23; B01F 23/2311; B01F 23/231; B01F 23/236; B01F 23/2362
See application file for complete search history.

(56) References Cited

U.S. PATENT DOCUMENTS

| | | | |
|---|---|---|---|
| 1,242,493 A | 10/1917 | Stringham | |
| 1,420,773 A | 6/1922 | Stainbrook | |

(Continued)

FOREIGN PATENT DOCUMENTS

| | | |
|---|---|---|
| CA | 2898566 A1 | 8/2014 |
| CA | 2819177 C | 6/2019 |

(Continued)

OTHER PUBLICATIONS

Nuwave Brio 8-Qt Air Fryer, <https://www.amazon.com/dp/B089NKT312/ref>, date first available Jun. 3, 2020, 1 page.

(Continued)

*Primary Examiner* — Robert A Hopkins
(74) *Attorney, Agent, or Firm* — Mintz, Levin, Cohn, Ferris, Glovsky and Popeo, P.C. US

(57) ABSTRACT

A mixing chamber for use in a beverage carbonation system is provided. In one embodiment, the carbonation mixing chamber includes a housing, a fluid inlet pathway, a gas inlet pathway, and an outlet pathway. The housing may have an inner chamber, and the fluid inlet pathway can be configured to extend into the inner chamber of the housing and receive fluid from a fluid source. The gas inlet pathway can be configured to extend into the inner chamber of the housing and can be configured to receive gas from a gas source. The gas inlet pathway can include a plurality of nozzles positioned within the inner chamber and configured to direct gas in a plurality of directions that differ from one another. The outlet pathway can be configured to dispense a mixture of fluid and gas from the inner chamber.

19 Claims, 21 Drawing Sheets

(56) References Cited

U.S. PATENT DOCUMENTS

| | | | |
|---|---|---|---|
| 2,556,038 | A | 6/1951 | Kollsman |
| 4,049,243 | A | 9/1977 | Kramer |
| 4,251,473 | A | 2/1981 | Gilbey |
| 4,518,541 | A | 5/1985 | Harris |
| D279,499 | S | 7/1985 | Case |
| 4,752,138 | A | 6/1988 | Rufer |
| 4,866,324 | A | 9/1989 | Yuzawa et al. |
| 5,038,976 | A | 8/1991 | Mcmillin |
| 5,128,574 | A | 7/1992 | Koizumi et al. |
| 5,156,871 | A | 10/1992 | Goulet et al. |
| 5,329,975 | A | 7/1994 | Heitel |
| D360,804 | S | 8/1995 | Hamada et al. |
| 6,095,677 | A | 8/2000 | Karkos et al. |
| 6,336,603 | B1 | 1/2002 | Karkos et al. |
| D463,711 | S | 10/2002 | Josancy |
| D474,937 | S | 5/2003 | Josancy |
| 6,712,497 | B2 | 3/2004 | Jersey et al. |
| 7,163,192 | B2 | 1/2007 | Aoki et al. |
| D551,020 | S | 9/2007 | Kozlowski et al. |
| 7,288,276 | B2 | 10/2007 | Rona et al. |
| D557,984 | S | 12/2007 | Kozlowski et al. |
| D611,757 | S | 3/2010 | Reiner |
| D616,699 | S | 6/2010 | Hoare et al. |
| 7,731,161 | B2 | 6/2010 | Seiwert et al. |
| D620,743 | S | 8/2010 | Hsiao |
| 7,918,436 | B2 | 4/2011 | Hara |
| D644,875 | S | 9/2011 | Audette |
| 8,051,999 | B2 | 11/2011 | Carmody et al. |
| D654,316 | S | 2/2012 | Audette |
| 8,172,453 | B2 | 5/2012 | Boussemart et al. |
| D664,393 | S | 7/2012 | Dietz |
| D664,807 | S | 8/2012 | Annis et al. |
| D666,057 | S | 8/2012 | Theuretzbacher |
| D668,115 | S | 10/2012 | Potter |
| 8,282,268 | B2 | 10/2012 | Karkos et al. |
| 8,286,815 | B2 | 10/2012 | Thierjung et al. |
| D677,113 | S | 3/2013 | Reiner |
| D684,425 | S | 6/2013 | Nordwall |
| 8,561,842 | B2 | 10/2013 | Pizzacalla et al. |
| D696,071 | S | 12/2013 | Hammad |
| 8,596,863 | B2 | 12/2013 | Lescanec et al. |
| 8,621,990 | B2 | 1/2014 | Fang et al. |
| 8,631,963 | B2 | 1/2014 | Lane et al. |
| 8,668,376 | B2 | 3/2014 | Krauchi et al. |
| 8,807,824 | B2 | 8/2014 | Bodum |
| D713,670 | S | 9/2014 | Coblentz et al. |
| 8,826,688 | B2 | 9/2014 | Tachibana et al. |
| 8,833,241 | B2 | 9/2014 | Santoiemmo |
| 8,840,092 | B2 | 9/2014 | Kumar et al. |
| 8,844,555 | B2 | 9/2014 | Schneider |
| 8,869,824 | B2 | 10/2014 | Arov |
| 8,939,173 | B2 | 1/2015 | Yahr et al. |
| 8,960,500 | B2 | 2/2015 | Van Opstal et al. |
| 9,044,718 | B2 | 6/2015 | Ludwig et al. |
| 9,045,722 | B2 | 6/2015 | Reif et al. |
| 9,056,287 | B2 | 6/2015 | Peltola et al. |
| 9,060,650 | B2 | 6/2015 | De |
| 9,107,448 | B2 | 8/2015 | Giardino et al. |
| 9,107,449 | B2 | 8/2015 | Njaastad et al. |
| 9,107,533 | B2 | 8/2015 | Volz et al. |
| 9,145,243 | B2 | 9/2015 | Kim et al. |
| 9,161,654 | B2 | 10/2015 | Belmont |
| 9,166,448 | B2 | 10/2015 | Lam et al. |
| D747,143 | S | 1/2016 | Schomacher et al. |
| 9,302,229 | B2 | 4/2016 | Leung et al. |
| 9,375,686 | B2 | 6/2016 | Boarman et al. |
| 9,409,758 | B2 | 8/2016 | Mchale et al. |
| 9,409,759 | B2 | 8/2016 | Wilder et al. |
| 9,421,503 | B2 | 8/2016 | An et al. |
| 9,440,836 | B2 | 9/2016 | Quittner et al. |
| 9,453,580 | B2 | 9/2016 | Arnau et al. |
| 9,492,796 | B2 | 11/2016 | An et al. |
| 9,505,510 | B2 | 11/2016 | Hatherell |
| 9,527,047 | B2 | 12/2016 | Ring et al. |
| D776,482 | S | 1/2017 | Lin |
| D779,046 | S | 2/2017 | Tansey, Jr. |
| 9,630,157 | B2 | 4/2017 | Li et al. |
| 9,668,608 | B2 | 6/2017 | Mori et al. |
| 9,687,796 | B2 | 6/2017 | Hoare et al. |
| 9,702,616 | B2 | 7/2017 | Kim et al. |
| 9,718,035 | B2 | 8/2017 | Bandixen et al. |
| 9,723,863 | B2 | 8/2017 | Njaastad et al. |
| 9,751,054 | B2 | 9/2017 | Jin et al. |
| 9,789,449 | B2 | 10/2017 | Kyong et al. |
| 9,795,245 | B2 | 10/2017 | Mulvaney et al. |
| 9,801,500 | B2 | 10/2017 | Ven Der Woning |
| 9,810,375 | B2 | 11/2017 | Rider et al. |
| 9,854,935 | B2 | 1/2018 | Danieli et al. |
| 9,868,564 | B2 | 1/2018 | Mcgirr et al. |
| 9,889,414 | B2 | 2/2018 | Kang et al. |
| 9,897,220 | B2 | 2/2018 | Cohen et al. |
| 9,933,203 | B2 | 4/2018 | An et al. |
| 9,945,603 | B2 | 4/2018 | Hwang et al. |
| D818,772 | S | 5/2018 | Raymond |
| D821,804 | S | 7/2018 | Wessels |
| 10,016,086 | B2 | 7/2018 | Castleberry |
| 10,028,614 | B2 | 7/2018 | Perentes et al. |
| 10,051,988 | B2 | 8/2018 | Gordon et al. |
| 10,058,826 | B2 | 8/2018 | Cohen et al. |
| 10,143,978 | B2 | 12/2018 | Tipton |
| 10,190,817 | B2 | 1/2019 | An et al. |
| 10,193,411 | B2 | 1/2019 | Tajima et al. |
| 10,201,171 | B2 | 2/2019 | Gordon et al. |
| 10,201,785 | B2 | 2/2019 | Cohen et al. |
| D848,215 | S | 5/2019 | Chen |
| 10,280,061 | B2 | 5/2019 | Ko et al. |
| 10,307,718 | B2 | 6/2019 | Waisman |
| 10,328,362 | B2 | 6/2019 | Chang et al. |
| 10,329,061 | B2 | 6/2019 | Dias et al. |
| 10,330,379 | B2 | 6/2019 | Kim et al. |
| 10,350,561 | B1 | 7/2019 | Dushine et al. |
| 10,383,476 | B2 | 8/2019 | Alexander et al. |
| 10,401,019 | B2 | 9/2019 | Xia et al. |
| 10,406,488 | B2 | 9/2019 | Song et al. |
| 10,408,363 | B2 | 9/2019 | Biwersi et al. |
| 10,413,872 | B2 | 9/2019 | Thangamuthu et al. |
| 10,455,973 | B2 | 10/2019 | Dollner et al. |
| 10,455,975 | B2 | 10/2019 | Saunders |
| 10,456,757 | B1 | 10/2019 | Blichmann |
| 10,473,385 | B2 | 11/2019 | Lee et al. |
| 10,513,424 | B2 | 12/2019 | Tansey, Jr. |
| 10,520,105 | B2 | 12/2019 | Eszterle et al. |
| 10,524,617 | B2 | 1/2020 | Perrin et al. |
| 10,537,200 | B2 | 1/2020 | Ait Bouziad et al. |
| D875,462 | S | 2/2020 | Chen |
| D876,163 | S | 2/2020 | Chow |
| D879,540 | S | 3/2020 | Chen |
| 10,595,670 | B2 | 3/2020 | Lagouche et al. |
| 10,631,686 | B2 | 4/2020 | Abdo et al. |
| 10,682,007 | B2 | 6/2020 | Fischer |
| 10,702,835 | B2 | 7/2020 | Tran et al. |
| 10,702,838 | B2 | 7/2020 | Chaussin et al. |
| 10,707,734 | B2 | 7/2020 | Holenstein et al. |
| 10,729,276 | B2 | 8/2020 | Bentley et al. |
| 10,754,427 | B2 | 8/2020 | Kolar et al. |
| 10,780,408 | B2 | 9/2020 | Schöb et al. |
| 10,781,928 | B2 | 9/2020 | Tanimura et al. |
| 10,794,483 | B2 | 10/2020 | Sasanuma et al. |
| 10,807,049 | B2 | 10/2020 | Abdo et al. |
| 10,813,501 | B2 | 10/2020 | Helf et al. |
| 10,827,863 | B2 | 11/2020 | Brown et al. |
| 10,859,177 | B2 | 12/2020 | Kuzuya |
| 10,863,851 | B1 | 12/2020 | Ganahl |
| 10,869,572 | B2 | 12/2020 | Blatt |
| 10,888,825 | B2 | 1/2021 | Jeong et al. |
| 10,894,639 | B2 | 1/2021 | Pruiett |
| 10,905,287 | B2 | 2/2021 | Tu et al. |
| 10,906,013 | B2 | 2/2021 | Cohen et al. |
| 10,945,557 | B2 | 3/2021 | Nishimura et al. |
| D916,564 | S | 4/2021 | Kent et al. |
| D917,229 | S | 4/2021 | Kent et al. |
| 10,975,978 | B2 | 4/2021 | Tamba |
| 10,980,369 | B2 | 4/2021 | Glucksman |
| 10,981,123 | B2 | 4/2021 | Park |

(56) References Cited

U.S. PATENT DOCUMENTS

| | | | |
|---|---|---|---|
| 10,994,980 | B2 | 5/2021 | Jangbarwala et al. |
| 11,013,353 | B2 | 5/2021 | Hambrock et al. |
| 11,021,359 | B2 | 6/2021 | Bissen et al. |
| 11,051,641 | B2 | 7/2021 | Schucker et al. |
| 11,051,649 | B2 | 7/2021 | Anthony et al. |
| 11,060,714 | B2 | 7/2021 | Mattice |
| 11,084,007 | B2 | 8/2021 | Adams |
| 11,089,891 | B2 | 8/2021 | Alexander |
| 11,096,517 | B2 | 8/2021 | Spijker et al. |
| 11,097,236 | B2 | 8/2021 | Alexander et al. |
| 11,110,418 | B2 | 9/2021 | Furman et al. |
| 11,124,404 | B2 | 9/2021 | Von Kraus et al. |
| 11,142,445 | B2 | 10/2021 | Leone |
| 11,147,413 | B2 | 10/2021 | Nabeiro et al. |
| 11,148,927 | B2 | 10/2021 | Wing et al. |
| 11,166,593 | B2 | 11/2021 | Trakselis |
| 11,167,231 | B2 | 11/2021 | Akdim et al. |
| 11,194,443 | B2 | 12/2021 | Deo et al. |
| 11,199,275 | B2 | 12/2021 | Narita et al. |
| 11,206,941 | B2 | 12/2021 | Abdo et al. |
| 11,208,310 | B2 | 12/2021 | Tansey et al. |
| 11,247,186 | B2 | 2/2022 | Topp-manske |
| 11,250,659 | B2 | 2/2022 | Tansey et al. |
| 11,284,738 | B2 | 3/2022 | Cahen et al. |
| 11,305,242 | B2 | 4/2022 | Wilder et al. |
| 11,317,755 | B2 | 5/2022 | Nabeiro et al. |
| 11,318,427 | B2 | 5/2022 | Fantappie et al. |
| 11,330,938 | B2 | 5/2022 | Deng et al. |
| 11,344,149 | B2 | 5/2022 | Byun et al. |
| 11,370,648 | B2 | 6/2022 | Melville, Jr. et al. |
| 11,408,531 | B2 | 8/2022 | Narita et al. |
| 11,412,878 | B1 | 8/2022 | Wolf |
| 11,413,587 | B2 | 8/2022 | Van De Sluis et al. |
| 11,433,362 | B2 | 9/2022 | Danieli et al. |
| 11,440,786 | B2 | 9/2022 | Springer et al. |
| D973,436 | S | 12/2022 | Junker et al. |
| 11,524,268 | B2 | 12/2022 | Jersey et al. |
| 11,529,594 | B2 | 12/2022 | Sawyer et al. |
| 11,534,730 | B1 | 12/2022 | Springer et al. |
| 11,542,069 | B2 | 1/2023 | Yueh |
| 11,564,407 | B2 | 1/2023 | Long |
| D981,172 | S | 3/2023 | Liang |
| 11,603,939 | B2 | 3/2023 | Stanton et al. |
| 11,758,930 | B1 | 9/2023 | Pamplin |
| 2013/0026665 | A1 | 1/2013 | Buosi et al. |
| 2015/0151258 | A1 | 6/2015 | Cohen et al. |
| 2016/0332124 | A1 | 11/2016 | Cohen |
| 2017/0215645 | A1 | 8/2017 | Doglioni Majer et al. |
| 2017/0246597 | A1 | 8/2017 | Mcclean et al. |
| 2018/0215603 | A1 | 8/2018 | Hecht |
| 2018/0251358 | A1 | 9/2018 | Wing et al. |
| 2019/0134583 | A1 | 5/2019 | Lautenschläger et al. |
| 2019/0262230 | A1 | 8/2019 | Bentkovski |
| 2019/0270630 | A1 | 9/2019 | Dahan et al. |
| 2019/0274482 | A1 | 9/2019 | Abdo et al. |
| 2019/0292034 | A1 | 9/2019 | Wood et al. |
| 2019/0335952 | A1 | 11/2019 | Di Bari |
| 2019/0367350 | A1 | 12/2019 | Bhutani et al. |
| 2020/0047137 | A1 | 2/2020 | Wilder et al. |
| 2020/0060465 | A1 | 2/2020 | Longman et al. |
| 2020/0077841 | A1 | 3/2020 | Dercar et al. |
| 2020/0107669 | A1 | 4/2020 | Byun et al. |
| 2020/0187718 | A1 | 6/2020 | Seidl |
| 2020/0229637 | A1 | 7/2020 | Han et al. |
| 2020/0345170 | A1 | 11/2020 | Jarisch et al. |
| 2020/0359822 | A1 | 11/2020 | Dercar et al. |
| 2020/0359841 | A1 | 11/2020 | Dercar et al. |
| 2021/0013785 | A1 | 1/2021 | Liang et al. |
| 2021/0015303 | A1 | 1/2021 | Byun et al. |
| 2021/0032087 | A1 | 2/2021 | Tessicini et al. |
| 2021/0052091 | A1 | 2/2021 | Lee et al. |
| 2021/0100391 | A1 | 4/2021 | Moon et al. |
| 2021/0137315 | A1 | 5/2021 | Byun et al. |
| 2021/0179411 | A1 | 6/2021 | Dahan et al. |
| 2021/0259472 | A1 | 8/2021 | Seidler et al. |
| 2021/0276748 | A1 | 9/2021 | Deslandes et al. |
| 2021/0307564 | A1 | 10/2021 | Gort-Barten |
| 2021/0316979 | A1 | 10/2021 | Hayes-pankhurst et al. |
| 2021/0362993 | A1 | 11/2021 | Shafir et al. |
| 2022/0002134 | A1 | 1/2022 | Pellaud |
| 2022/0024748 | A1 | 1/2022 | Fantappie et al. |
| 2022/0039602 | A1 | 2/2022 | Xiong |
| 2022/0040651 | A1 | 2/2022 | Böttcher et al. |
| 2022/0042618 | A1 | 2/2022 | Kuzuya |
| 2022/0082542 | A1 | 3/2022 | Lachwani et al. |
| 2022/0098020 | A1 | 3/2022 | Garcia Tebar |
| 2022/0146001 | A1 | 5/2022 | Miyazoe et al. |
| 2022/0151439 | A1 | 5/2022 | Fantappie et al. |
| 2022/0192422 | A1 | 6/2022 | Choi |
| 2022/0218137 | A1 | 7/2022 | Iverson et al. |
| 2022/0268617 | A1 | 8/2022 | Zheng |
| 2022/0280392 | A1 | 9/2022 | Baxter |
| 2022/0287333 | A1 | 9/2022 | Aldred et al. |
| 2022/0390024 | A1 | 12/2022 | Duff et al. |
| 2023/0065625 | A1 | 3/2023 | Mills et al. |
| 2023/0140241 | A1 | 5/2023 | Tanaka et al. |
| 2023/0148788 | A1 | 5/2023 | Van Druten et al. |
| 2023/0204110 | A1 | 6/2023 | Sobka et al. |
| 2023/0255389 | A1 | 8/2023 | Moughton et al. |

FOREIGN PATENT DOCUMENTS

| | | | |
|---|---|---|---|
| CN | 1016312 | B | 4/1992 |
| CN | 201200323 | Y | 3/2009 |
| CN | 102278516 | A | 12/2011 |
| CN | 203314745 | U | 12/2013 |
| CN | 203576299 | U | 5/2014 |
| CN | 104582509 | A | 4/2015 |
| CN | 105595868 | A | 5/2016 |
| CN | 105997523 | A | 10/2016 |
| CN | 106029213 | A | 10/2016 |
| CN | 106667266 | A | 5/2017 |
| CN | 105078252 | B | 10/2017 |
| CN | 107362706 | A | 11/2017 |
| CN | 106510363 | B | 12/2017 |
| CN | 107692737 | A | 2/2018 |
| CN | 108056923 | A | 5/2018 |
| CN | 106388503 | B | 6/2018 |
| CN | 106419392 | B | 6/2018 |
| CN | 106667194 | B | 6/2018 |
| CN | 108324054 | A | 7/2018 |
| CN | 108338621 | A | 7/2018 |
| CN | 105816042 | B | 8/2018 |
| CN | 108567334 | A | 9/2018 |
| CN | 108814292 | A | 11/2018 |
| CN | 109171502 | A | 1/2019 |
| CN | 109222555 | A | 1/2019 |
| CN | 109380973 | A | 2/2019 |
| CN | 106955024 | B | 4/2019 |
| CN | 109549477 | A | 4/2019 |
| CN | 109662579 | A | 4/2019 |
| CN | 109966941 | A | 7/2019 |
| CN | 109984598 | A | 7/2019 |
| CN | 106923679 | B | 9/2019 |
| CN | 110247484 | A | 9/2019 |
| CN | 110279302 | A | 9/2019 |
| CN | 110279304 | A | 9/2019 |
| CN | 109584027 | B | 11/2019 |
| CN | 110664248 | A | 1/2020 |
| CN | 105011305 | B | 5/2020 |
| CN | 111141408 | A | 5/2020 |
| CN | 111449472 | A | 7/2020 |
| CN | 111528668 | A | 8/2020 |
| CN | 111588270 | A | 8/2020 |
| CN | 111744378 | A | 10/2020 |
| CN | 109846366 | B | 12/2020 |
| CN | 110272011 | B | 12/2020 |
| CN | 110529604 | B | 12/2020 |
| CN | 112041259 | A | 12/2020 |
| CN | 112089338 | A | 12/2020 |
| CN | 112205874 | A | 1/2021 |
| CN | 112283404 | A | 1/2021 |
| CN | 112421819 | A | 2/2021 |
| CN | 112426036 | A | 3/2021 |

(56) References Cited

FOREIGN PATENT DOCUMENTS

| | | | | |
|---|---|---|---|---|
| CN | 107421174 | B | | 4/2021 |
| CN | 112971528 | A | | 6/2021 |
| CN | 113142938 | A | | 7/2021 |
| CN | 113143007 | A | | 7/2021 |
| CN | 113171010 | A | | 7/2021 |
| CN | 108236059 | B | | 8/2021 |
| CN | 108768070 | B | | 9/2021 |
| CN | 111720590 | B | | 10/2021 |
| CN | 113498973 | A | | 10/2021 |
| CN | 113558447 | A | | 10/2021 |
| CN | 113048263 | B | | 11/2021 |
| CN | 113598610 | A | | 11/2021 |
| CN | 113653829 | A | | 11/2021 |
| CN | 113885601 | A | | 1/2022 |
| CN | 113907584 | A | | 1/2022 |
| CN | 113907585 | A | | 1/2022 |
| CN | 113958728 | A | | 1/2022 |
| CN | 111839219 | B | | 3/2022 |
| CN | 114145631 | A | | 3/2022 |
| CN | 114158942 | A | | 3/2022 |
| CN | 111839218 | B | | 4/2022 |
| CN | 114341051 | A | | 4/2022 |
| CN | 106235882 | B | | 5/2022 |
| CN | 112005032 | B | | 5/2022 |
| CN | 114424888 | A | | 5/2022 |
| CN | 110461197 | B | | 7/2022 |
| CN | 114704671 | A | | 7/2022 |
| CN | 115040014 | A | | 9/2022 |
| CN | 110985707 | B | | 11/2022 |
| CN | 116480810 | A | | 7/2023 |
| CN | 116538328 | A | | 8/2023 |
| EP | 1005897 | A3 | | 7/2002 |
| EP | 1351758 | B1 | | 7/2005 |
| EP | 1607664 | B1 | | 1/2008 |
| EP | 1751011 | B1 | | 1/2008 |
| EP | 1767262 | B1 | | 8/2008 |
| EP | 1718403 | B1 | | 5/2011 |
| EP | 2340754 | B1 | | 10/2012 |
| EP | 2737834 | A1 | | 6/2014 |
| EP | 2311671 | B1 | | 11/2014 |
| EP | 2802245 | A1 | | 11/2014 |
| EP | 3066033 | A4 | | 8/2017 |
| EP | 3524223 | A4 | | 5/2020 |
| EP | 2866593 | B1 | | 8/2020 |
| EP | 3753458 | A1 | | 12/2020 |
| EP | 4047360 | A1 | | 8/2022 |
| EP | 3810543 | A4 | | 9/2022 |
| GB | 2486872 | B | | 3/2016 |
| KR | 20160123163 | A | * | 10/2016 ............ C01B 31/24 |
| WO | 9725130 | A1 | | 7/1997 |
| WO | 9807122 | A1 | | 2/1998 |
| WO | 0103817 | A1 | | 1/2001 |
| WO | 03098776 | A1 | | 11/2003 |
| WO | 2009135758 | A1 | | 11/2009 |
| WO | 2014201753 | A1 | | 12/2014 |
| WO | 2015109639 | A1 | | 7/2015 |
| WO | 2016202815 | A1 | | 12/2016 |
| WO | 2021174309 | A1 | | 9/2021 |
| WO | 2021179024 | A1 | | 9/2021 |
| WO | 2021201021 | A1 | | 10/2021 |
| WO | 2021228877 | A1 | | 11/2021 |
| WO | 2022069098 | A1 | | 4/2022 |
| WO | 2022101253 | A1 | | 5/2022 |
| WO | 2022106683 | A1 | | 5/2022 |
| WO | 2022171986 | A2 | | 8/2022 |
| WO | 2022194644 | A1 | | 9/2022 |

OTHER PUBLICATIONS

International Search Report and Written Opinion Received for PCT Patent Application No. PCT/CN2023/100571, mailed on Feb. 28, 2024, 7 pages.

* cited by examiner

CARBONATION MIXING NOZZLES

This application is a continuation application, which claims the benefit of Application No. PCT/CN2023/100571, filed on Jun. 16, 2023, entitled "CARBONATION MIXING NOZZLES", which is hereby also incorporated by reference in its entirety.

FIELD

Various nozzles for use in mixing gas and fluid are provided.

BACKGROUND

In food products such as soda, sparkling water, tea, juice, or coffee, carbon dioxide (CO2) or a combination of nitrogen and CO2 is typically used to create the bubbles that form and rise through the liquid. Several factors dictate the carbonation level of beverages, including sugar and alcohol, however, the most significant factors are CO2 pressure and temperature. The quantity of CO2 dissolved in a beverage can impact the flavor, mouthfeel, and palatability of the beverage.

Many existing carbonated beverage producers carbonate beverages in their manufacturing plants and then add carbonated beverages in appropriate pressure bottles, tanks or other containers to authorized distributors of carbonated beverages, retailers, grocery stores, etc. Commercial beverage carbonation usually involves mixing carbon-dioxide with liquid under pressure with intensive mixing. Such commercial methods, however, require elaborate and sophisticated equipment not available at the point of beverage consumption. Further, shipping and storage of pressurized bottles and containers increases costs.

Beverage carbonation machines suitable for home use have been developed, but typically utilize a specialized container to be attached to the device. The container is pre-filled with liquid and is pressurized with carbon dioxide injected into the liquid. The most common complaint of people who use home seltzer machines is that the sodas these machines produce are not as bubbly as store-bought versions.

Accordingly, there remains a need for improved methods and devices for carbonating a liquid.

SUMMARY

Jet nozzles for use in delivering a gas, such as carbon-dioxide, are provided, as well as various carbonation chambers for use in carbonating a liquid.

In one embodiment, a carbonation mixing chamber is provided having a housing with an inner chamber, a fluid inlet pathway, a gas inlet pathway, and an outlet pathway. The fluid inlet pathway can extend into the inner chamber of the housing and can be configured to receive a fluid from a fluid source. A gas inlet pathway can extend into the inner chamber of the housing and can be configured to receive gas from a gas source. The gas inlet pathway can have a plurality of nozzles positioned within the inner chamber that can be configured to direct gas in a plurality of directions that differ from one another. The outlet pathway can extend from the housing and can be configured to dispense a mixture of fluid and gas from the inner chamber.

One or more of the following features can be included in any feasible combination. For example, the housing can include an upper portion and a lower portion mated to one another to define the inner chamber therein. In another example, the plurality of nozzles can be configured to speed up flow of gas flowing through the gas inlet pathway. In certain embodiments, the gas inlet pathway can include a tube having a terminal end with a plurality of nozzles formed in the terminal end.

In certain embodiments, the housing can include a base having a plate disposed on the base and within the inner chamber such that the plate and the base define the gas inlet pathway therebetween. In some aspects, a tube can extend from the base and be configured to couple to a gas source and deliver gas to the inlet pathway between the base and the plate. In some aspects the plurality of nozzles can include first, second, third, and fourth nozzles formed between the plate and the base. For example, the plurality of nozzles can include channels formed between the plate and the base.

In certain embodiments, the nozzle can include a projection extending upward from a bottom inner surface of the housing and having a plurality of fluid flow channels therethrough. In some aspects, the plurality of fluid flow channels in the projection can extend radially outward from a central fluid flow channel formed in a tubular member extending from the housing.

In certain embodiments, the gas inlet pathway can include a tubular member extending through sidewall of the housing and defining a lumen therethrough, and the plurality of nozzles can include a plurality of outlet ports formed in a terminal end of the tubular member. The plurality of outlet ports can include a first outlet port oriented along a longitudinal axis of the lumen in the tubular member, a second outlet port oriented along an axis extending transverse to the longitudinal axis and intersecting a base of the housing, and a third outlet port oriented along a second axis extending transverse to the longitudinal axis and intersecting the base of the housing.

In another embodiment, a carbonation system is provided and can include a housing defining a chamber therein, the housing having a fluid inlet configured receive fluid from a fluid source, a fluid outlet configured to allow fluid within the chamber to flow from the chamber, and a gas inlet nozzle positioned within the inner chamber and configured to deliver gas into a fluid in the chamber, the gas inlet nozzle being configured to speed up a flow of gas flowing therethrough to aid in mixing the gas with fluid in the chamber.

One or more of the following features can be included in any feasible combination. For example, the gas inlet nozzle can include a plurality of outlets therein, and the plurality of outlets can be oriented in different directions. In some aspects, the gas inlet nozzle is on a terminal end of a tube extending through the housing. In some aspects, the tube can extend through a sidewall of the housing. In another aspect, the tube can extend through a base of the housing. In some aspects, the housing can include a base and a plate disposed on the base within the chamber such that the plate and the base define the gas inlet nozzle.

One or more of the following features can be included in any feasible combination. For example, the agitator can include a plurality of arms extending radially outward from a central shaft, a terminal end of the central shaft being freely movably positioned within a divot formed in the separation plate.

DESCRIPTION OF DRAWINGS

These and other features will be more readily understood from the following detailed description taken in conjunction with the accompanying drawings, in which.

Figure 1A:
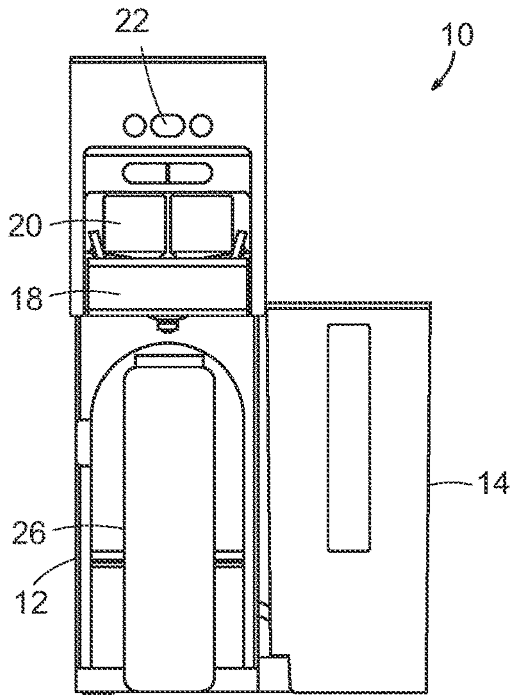
FIG. 1A is a front view of one embodiment of a beverage dispensing system.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain illustrative embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting illustrative embodiments and that the scope of the present invention is defined solely by the claims. The features illustrated or described in connection with one illustrative embodiment can be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

In general, various jet nozzles for use in delivering a gas into a liquid are provided. Further, various carbonation mixing chambers having one or more jet nozzles for use with a carbonation system are provided. In general, a carbonation mixing chamber for use with a carbonation system may include a housing having an inner chamber, a fluid inlet pathway, a gas inlet pathway and an outlet pathway. The fluid inlet pathway can extend into the inner chamber of the housing and can be configured to receive fluid from a fluid source. The gas inlet pathway extends into the inner chamber of the housing and can be configured to receive gas from a gas source. The gas inlet pathway can have a plurality of nozzles positioned within the inner chamber and configured to direct gas in a plurality of directions that differ from one another. The outlet pathway can extend from the housing and be configured to dispense a mix of fluid and gas from the inner chamber.

The mixing of liquids and gases within the carbonation mixing chamber conventionally requires high pressure. The resulting high pressure within the chamber and the pressure differential between the interior of the chamber and the environment can cause damage to the physical components and couplings of components within the chamber in conventional systems. For example, in prior systems, components such as impellers and motors were subject to fatigue as a result of the pressure differential. This in turn can lead to leaks and can require specialized materials that would be capable of withstanding such pressures. Accordingly, in the disclosed embodiments, liquids (e.g., water) can be agitated directly by a gas (e.g., carbon dioxide) using a unique jet nozzle. The jet nozzle(s) can be configured to inject gas into the liquid at high pressures. In this manner, the carbonation mixing chamber can be simplified by eliminating the need for a motor and/or whisk. Further, the use of jet nozzles may allow for achieving the required carbonation level at lower chamber pressures. By requiring lower chamber pressures, the pressure differential between the chamber and the environment is reduced, such that the material for the chamber has lower strength requirements, affording a manufacturer greater flexibility and choice as to what materials they would like to use for the carbonation mixing chamber. Further, as discussed herein, jet nozzles can be positioned in various designs, including a variety of holes and angles, so as to cause various patterns of agitation such that the gas dissolves within the liquid.

Figure 1B:
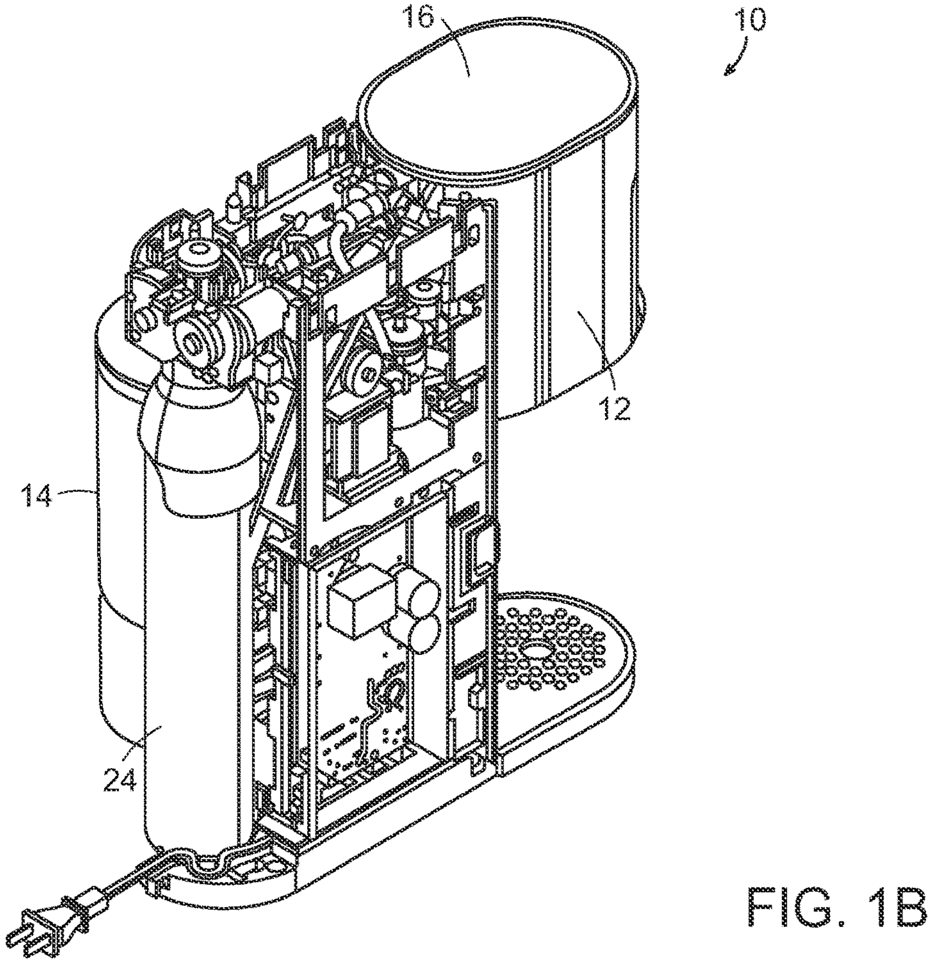
FIG. 1B is a rear perspective view of the beverage dispensing system of FIG. 1A with various housing components removed.

The jet nozzles and mixing chambers can be used in a number of beverage dispensing systems. FIGS. 1A-1B illustrate one embodiment of a beverage dispensing system 10 according to one embodiment. The beverage dispensing system 10 can be used to create and dispense customized beverages for a user, based on desired characteristics of the beverage. The illustrated beverage dispensing system 10 generally includes a housing 12 having a fluid reservoir 14 and a carbonation assembly 16. In the illustrated system 10, a carriage assembly 18 is included for receiving one or more ingredient containers 20 to be used in the creation of beverages. The ingredient containers 20 can include one or more additives (e.g., a flavorant, a vitamin, a food dye, etc.) to be included in a created beverage as desired. However, a person skilled in the art will appreciate that the mixing chamber disclosed herein can be used in any beverage dispensing system, including those that lack an ingredient container. Other beverage dispensing systems include, by way of non-limiting example, coffee, tea, beer, juice, and similar beverage-making apparatus.

During a beverage dispensing process, a user can actuate inputs located at a user interface 22 in order to select specific characteristics of the desired beverage, such as fluid volume and carbonation level. If the user selects inputs to indicate that the beverage is carbonated, water can be fed from the fluid reservoir 14 and into the carbonation assembly 16, and carbon-dioxide can be fed from a canister 24 and into the carbonation assembly 16 to produce carbonated water. The beverage can be dispensed into a container, such as a drinking glass 26.

Examples of beverage dispensing systems compatible with the carbonation mixing chamber provided herein can be found in U.S. patent application Ser. No. 17/989,640, entitled "INGREDIENT CONTAINERS FOR USE WITH BEVERAGE DISPENSERS" filed on Nov. 17, 2022, U.S. patent application Ser. No. 17/989,636 entitled "INGREDIENT CONTAINER WITH SEALING VALVE" filed on Nov. 17, 2022, U.S. patent application Ser. No. 17/989,642, entitled "DOSING ACCURACY" filed on Nov. 17, 2022, U.S. patent application Ser. No. 17/989,610 entitled "INGREDIENT CONTAINER" filed on Nov. 17, 2022, U.S. patent application Ser. No. 17/989,648 entitled "INGREDIENT CONTAINER WITH RETENTION FEATURES" filed on Nov. 17, 2022, U.S. patent application Ser. No. 17/989,657 entitled "INGREDIENT CONTAINER VALVE CONTROL" filed on Nov. 17, 2022, U.S. patent application Ser. No. 18/170,993 entitled "INGREDIENT CONTAINER VALVE CONTROL" filed on Feb. 17, 2023, U.S. patent application Ser. No. 17/744,459, entitled "FLAVORED BEVERAGE CARBONATION SYSTEM" filed on May 13, 2022, U.S. patent application Ser. No. 17/774,462 entitled "FLAVORANT FOR BEVERAGE CARBONATION SYSTEM" filed on May 13, 2022, and U.S. patent application Ser. No. 17/744,468 entitled "FLAVORED BEVERAGE CARBONATION PROCESS" filed on May 13, 2022, the contents of all of which are hereby incorporated by reference in their entirety.

FIGS. 2A-2K illustrate one embodiment of a carbonation mixing chamber 200 for use with a carbonation system, such as the system 10 shown in FIGS. 1A-1B. The illustrated carbonation mixing chamber 200 generally includes a housing 201 with a gas inlet pathway A, an outlet pathway B, and a fluid inlet pathway C, each of which is described in more detail below.

The housing 201 can have a variety of configurations and can have various shapes and sizes. While the particular configuration can vary depending on the beverage system configured to contain the housing 201, in the illustrated embodiment the housing 201 includes an upper portion 203 and a lower portion 205 that mate to define an inner chamber 240 therein. In the illustrated embodiment, the upper portion 203 has a substantially domed hemispheric shape. One flattened side 207 of the domed hemispheric shape can include projections containing one or more sensors and valves.

Figure 2A:
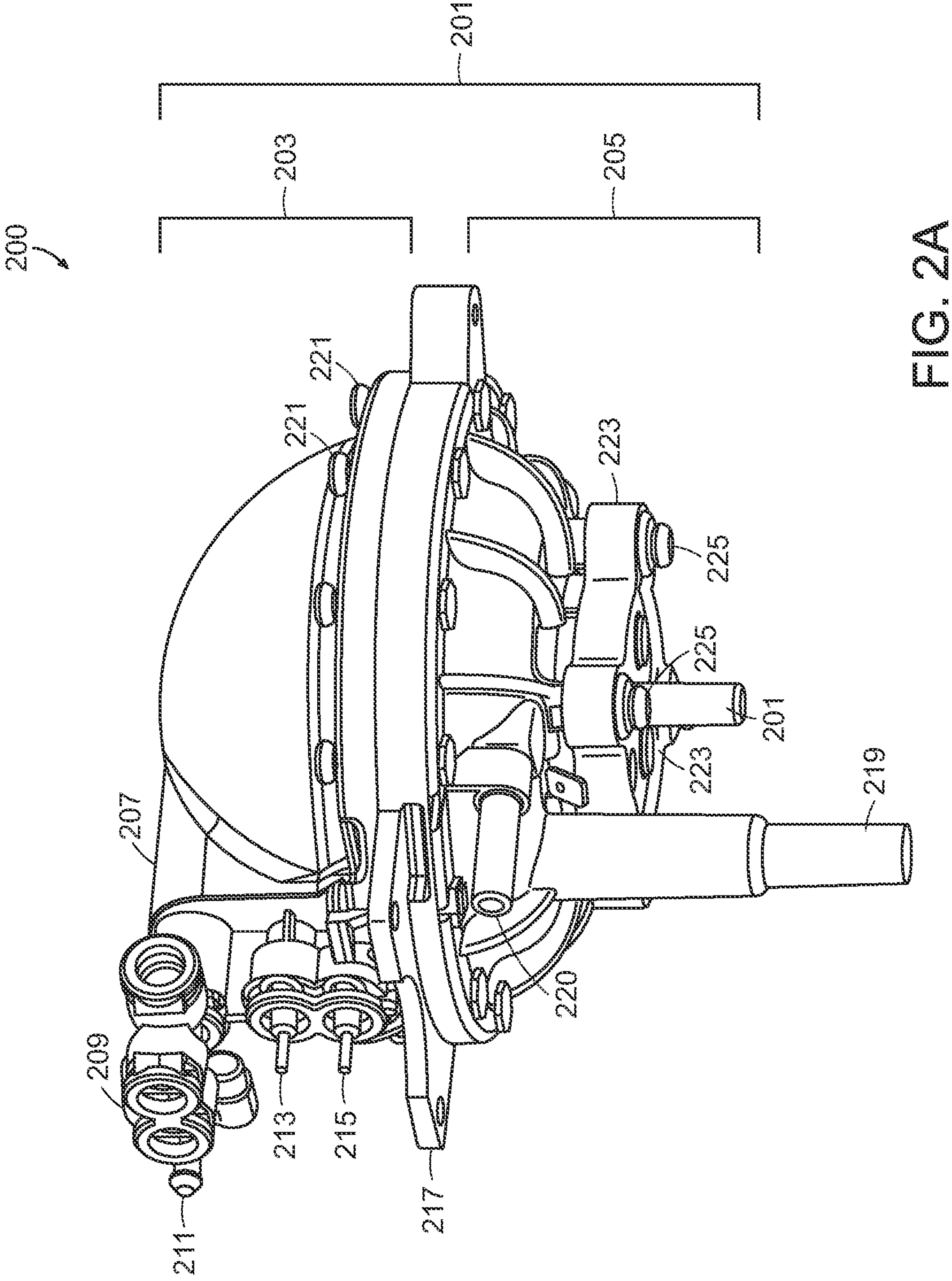
FIG. 2A is a first perspective view of one embodiment of a carbonation mixing chamber for use with a beverage dispensing system.
Figure 2B:
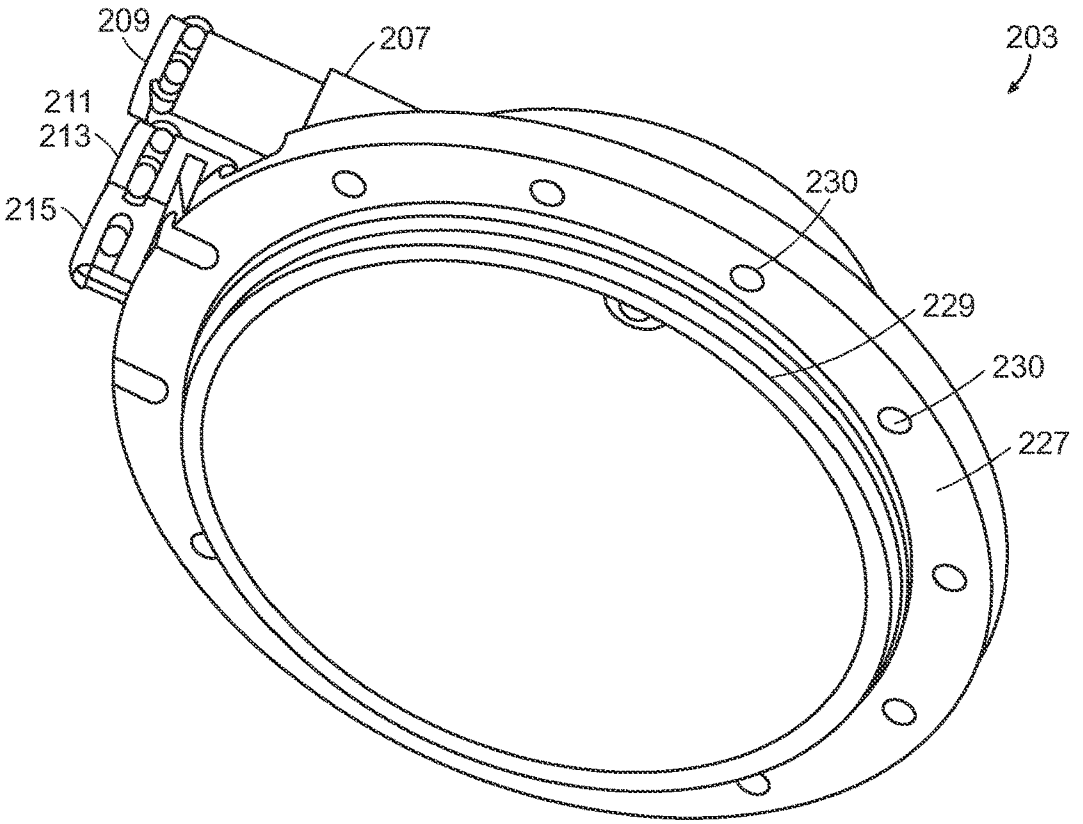
FIG. 2B is a bottom perspective view of an upper portion of a housing of the carbonation mixing chamber of FIG. 2A.

As best illustrated in FIG. 2B, the upper portion 203 can include a flat face 227 at the terminal edge the hemispheric shape, with an annular flange or ridge 229 projecting from the flat face. The ridge 229 can be substantially circumferential and it can be configured to receive an o-ring 244 to aid in forming a seal with lower portion. The flat face 227 of the hemispheric shape can also include a protruding flange containing one or more holes 230 configured to receive one or more screws 221.

Figure 2C:
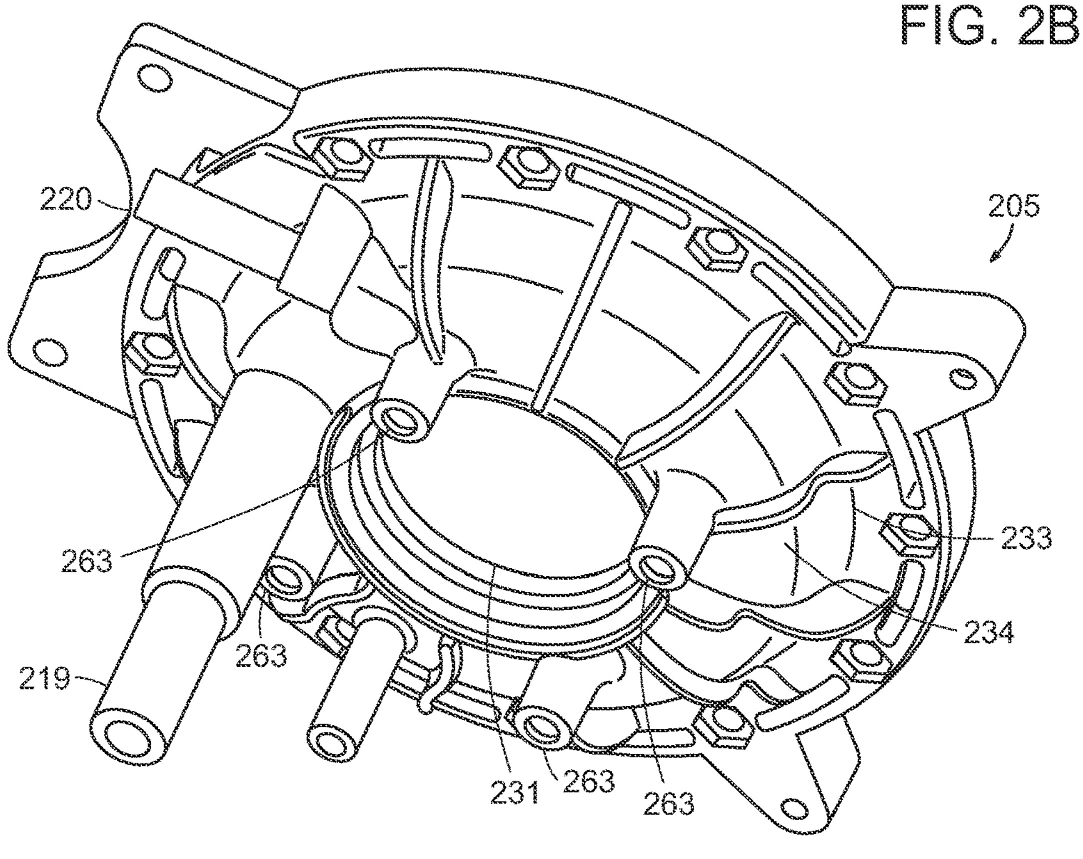
FIG. 2C is a bottom perspective view of a lower portion of a housing of the carbonation mixing chamber of FIG. 2A.
Figure 2D:
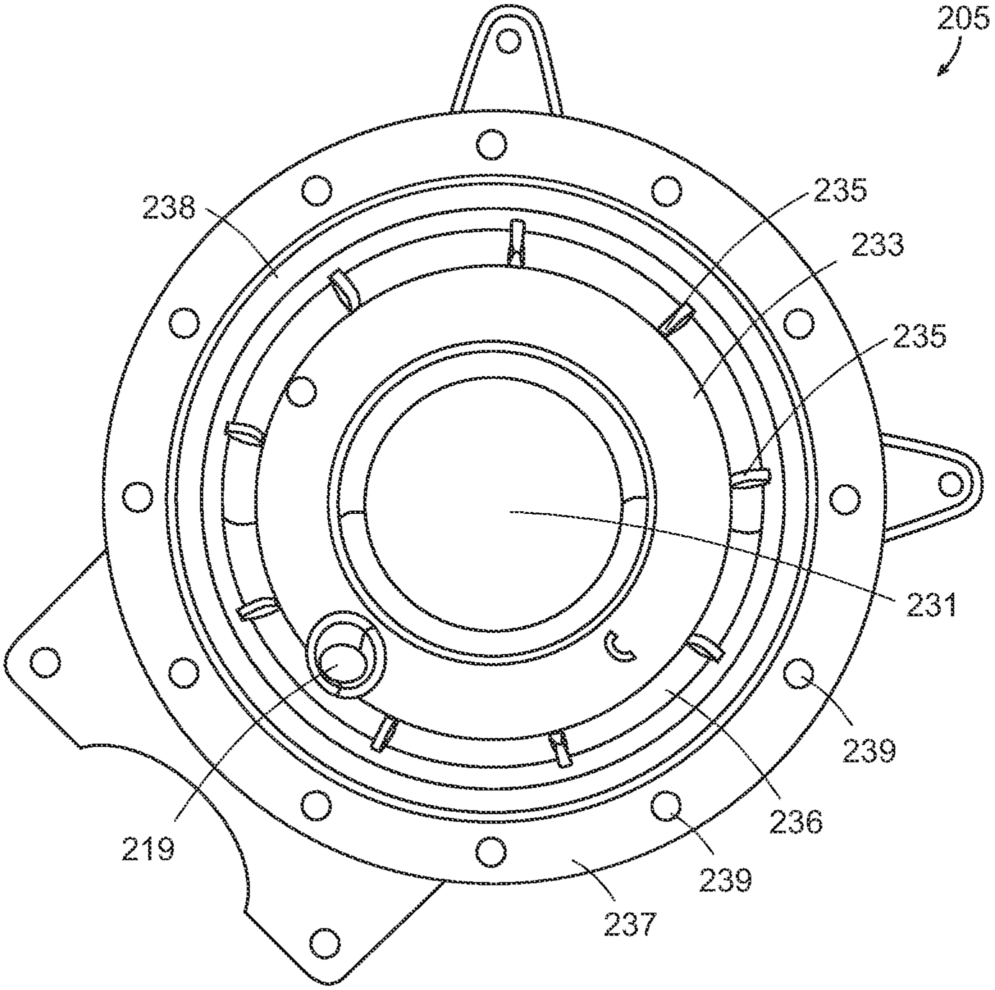
FIG. 2D is a top plane view of a lower portion of a housing of the carbonation mixing chamber of FIG. 2A.

Similar to the upper portion 203, the lower portion 205 of the housing 201 can also be hemi-spherical or cup-shaped. Optionally, it can have a height that is less than a height of the upper portion. As best illustrated in FIGS. 2C and 2D, the lower portion 205 of the housing 201 can have a bottom wall 233 with an external side 234 and internal side 236. The bottom wall 233 includes an enlarged, substantially circular opening 231 formed therein. The substantially circular opening 231 in the bottom wall of the lower portion can be configured to seat a disk 241 including a gas inlet pathway A, as discussed below. The lower portion 205 can also include a flattened rim 237 at the terminal end thereof. The rim 237 can have a circumferential channel 238 configured to receive the ridge 229 on the upper portion 203. The lower portion 205 can also include a plurality of holes 239 in the rim 237 that are configured to align with the holes 230 in the upper portion 203 and to receive screws 221 therethrough for mating the upper 203 and lower 205 portions. In some embodiments, the holes 230, 239 can be threaded. When mated, an o-ring 244 is compressed thereby forming a fluid-tight seal between the upper 203 and lower 205 portions to create a sealed inner chamber 240 therein.

The inner chamber 240 of the housing 201 is configured to receive gas and fluid. The inner chamber 240 of the housing 201 is further configured to hold a volume of gas, fluid, or a mixture thereof, including, for example, a carbonated liquid. The inner chamber 240 can be connected to one or more fluid inlets configured to receive a fluid from a fluid reservoir. As best shown in FIGS. 2A and 2C, the fluid inlet 220 is in the form of a tubular structure projecting from a sidewall of the lower portion 205 of the housing 201. Fluid received in the inner chamber 240 from the fluid reservoir can be mediated by a flow meter that is configured to regulate the amount of liquid that flows from the fluid reservoir to the inner chamber 240. The flow meter can regulate a pump, such as a high pressure pump that is configured to pump fluid from the fluid reservoir to the inner chamber 240. Liquids can include water, juice, coffee, and the like. The fluid inlet 220 can in some embodiments be configured to receive water or other flavorings. A fluid inlet pathway C can be composed of the fluid inlet 220 and accompanying fluid channels. A fluid inlet pathway C can have a first end including fluid inlet 220 that extends into the inner chamber 240 of the housing. The fluid inlet pathway C can have a second end that is configured to receive fluid from the fluid source or fluid reservoir (not shown).

The inner chamber 240 of the housing 201 can also be connected to one or more fluid outlets 219 configured to dispense the carbonated or treated beverage, which is a mixture of liquid and gas. As best shown in FIGS. 2A and 2C, in the illustrated embodiment, the fluid outlet 219 may be a tubular member that projects downward from a bottom wall 233 of the lower portion 205 of the housing 201. Such a configuration allows the fluid to fully drain out of the inner chamber 240. However, in some embodiments the carbonation system 100 can include an air pump configured to drive the treated or carbonated fluid out of the inner chamber 240 through the fluid outlet 219. The treated or carbonated fluid can be dispensed directly or indirectly into a container, such as a cup, a bottle, and the like. The fluid outlet 219 may form part of a fluid outlet pathway B having a first end positioned within the housing and a second end external to the housing. The fluid outlet pathway B can be further configured to dispense the mixture of fluid and gas from the inner chamber 240.

As further shown in FIGS. 2A-2B, the upper portion 203 of the housing 201 can include a plurality of sensors and valves embedded within a wall 207 of the upper portion 203. These sensors and valves may include a burst disk valve 211, and other valves 209 configured to vent pressure from the inner chamber 240 if the pressure in the inner chamber 240 exceeds a set threshold value. The burst disk valve 211 can be embedded within the upper portion 203 of the housing 201. The burst disk valve 211 can be configured to seal the inner chamber 240. However, when a set amount of pressure is reached in the inner chamber 240 the burst disk valve 211 can be configured to rupture, break, or open, thereby releasing the contents of the inner chamber 240. The operation of the burst disk valve 211 can be coupled to one or more pressure sensors configured to sense the pressure in the inner chamber 240. One or more pressure sensors can be embedded within the inner chamber 240 and can be configured to control the operation of the burst disk valve 211 and/or valves 209. One or more of the valves 209 can be configured to expel a set amount of pressure when the valve is opened. The valves 209 can include a solenoid vent configured to be repeatedly opened and closed to release pressure as needed in a slow release.

In other aspects, additional pressure release valves can be embedded within the upper portion 203 of the housing 201 to allow for fast diffusion of pressure from the inner chamber 240. For example, when additional pressure release valves can be configured to open so as to release the contents of the inner chamber 240 when the pressure measured in the inner chamber 240 exceeds a set threshold. For example, the upper portion 203 of the housing 201 can include one, or two, or more pressure release valves, each of which can be configured to release pressure when the pressure inside of the inner chamber 240 or the pressure differential between the inner chamber 240 and the environment reaches the same or different thresholds.

Additional sensors can be embedded within the housing 201. For example, additional sensors can include a temperature sensor configured to measure temperature in the chamber, such as a negative temperature coefficient (NTC) thermistor, or the like.

Each of the fluid inlet, gas inlet (discussed below), and fluid outlet can include a valve that is movable between open and closed positions. The inner chamber 240 can be configured to be fluidically sealed when the valves are in the closed position.

The upper portion 203 of the housing can also include a plurality of water sensors embedded within a wall 207 of the upper portion 203. As further shown in FIGS. 2A and 2B, the upper portion 203 can include a lower water sensor 215 positioned along the side with projections thereon 207. The lower water sensor 215 can be embedded within the domed hemisphere of the upper portion 203. The lower water sensor 215 can include a conductive probe that is configured to send a warning when the fluid level in the inner chamber 240 has reached the lower water sensor 215. The warning can warn the flow meter to stop the flow of water into the inner chamber 240 in a set amount of time. For example, the warning can span 2 seconds, or any other set amount of time depending upon the spacing between the lower water sensor 215 and the upper water sensor 213.

The upper portion 203 can also include an upper water sensor 213. As illustrated in FIGS. 2A and 2B, the upper water sensor 213 can be positioned along the side of the upper portion 203 having projections thereon 207, and can be positioned substantially above the lower water sensor 215. The upper water sensor 213 can be a conductive probe configured to send a signal to the flow meter to stop the flow of water into the inner chamber 240. The upper water sensor 213 can be configured to send a signal to the gas regulator to fill the inner chamber 240 202 with gas.

As best illustrated in FIGS. 2C and 2D, the lower portion 205 of the housing 201 includes a bottom wall 233 with an enlarged, substantially circular opening 231 formed therein. The lower portion 205 can have an interior surface 236 with a plurality of ribs 235 positioned thereon. As shown in FIG. 2D, the ribs 235 may be radially dispersed along the interior surface of the bottom wall 233. The ribs 235 can extend through the bottom wall to the exterior surface 234 of the lower portion 205. The ribs 235 can be configured to aid in the mixing of a gas with a fluid. The ribs can be integrally formed along the interior surface, or alternatively, can be affixed thereto. As shown in FIG. 2D, the ribs can be disperse along the interior surface 236 of the bottom wall latitudinaly. Alternatively, the ribs can be dispersed along the interior surface 236 of the bottom wall longitudinally. The ribs 235 can have any suitable shape, including having a fin-like shape with one end of the rib having a shorter height than a second end of the rib with a curve therebetween. The ribs 235 can have a substantially rectangular shape with equal heights at a first end and a second end. The ribs 235 can be straight or curved. In some embodiments, the ribs 235 can be formed of plastic. Each of the plurality of ribs 235 can be identical, or can vary in size or shape. The ribs 235 can be oriented longitudinally, latitudinaly, or any combination thereof. The ribs 235 can be configured to agitate the liquid and gas mixtures so as to improve carbonation by providing an additional surface area to the liquid, gas, or liquid and gas mixture. The ribs 235 provide additional surface area and roughness to the smooth internal walls so as to prevent liquids from spinning against the internal walls and instead so that the liquids mix with the gas in the inner chamber 240.

In other aspects, the interior surface of the inner chamber 240 can be formed from or coated with a hydrophilic material. The hydrophilic material can be configured to allow liquids contained within the inner chamber 240 to be in close proximity to the interior surface of the inner chamber 240 thus reducing the headspace or airgap within the inner chamber 240. This is advantageous as there is less space for a gas (i.e., CO2) to leave the liquid (i.e., H2O), thus providing improved carbonation. In some embodiments, the ribs 235 can also be coated or formed from a hydrophilic material.

Figure 2F:
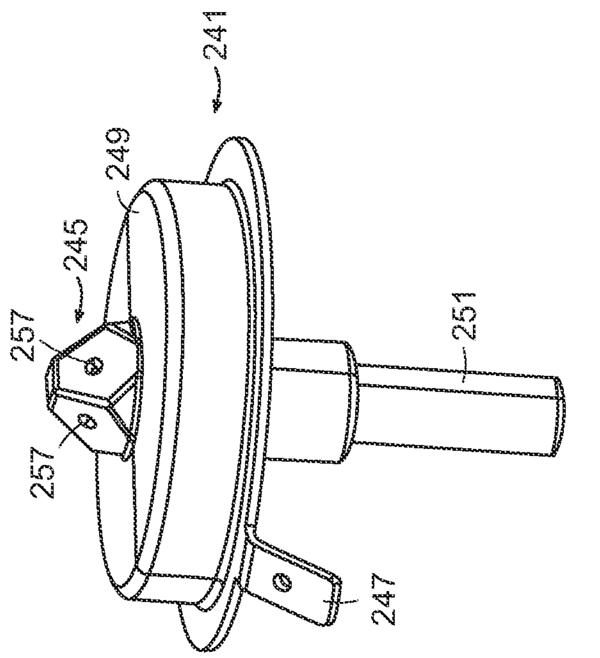
FIG. 2F is a side perspective view of the disk of FIG. 2E.
Figure 2E:
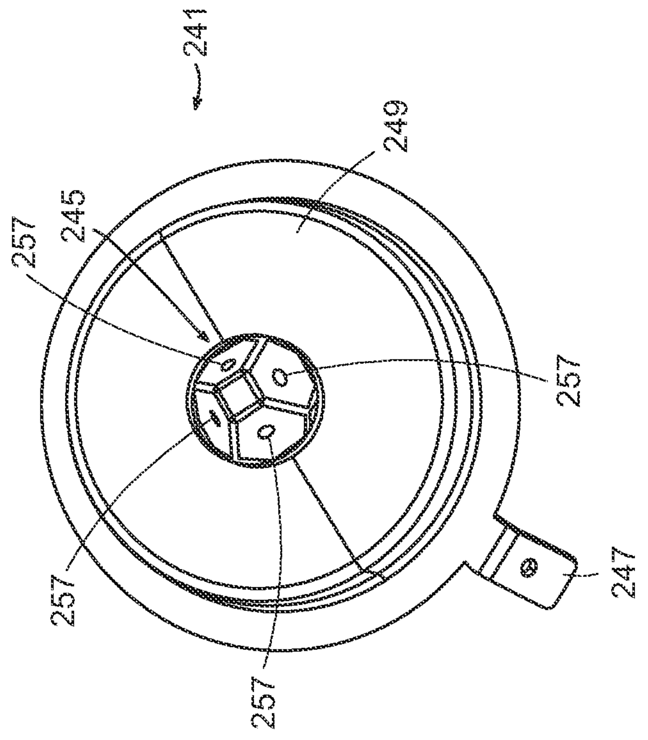
FIG. 2E is a top perspective view of a disk for use with the carbonation mixing chamber of FIG. 2A.
Figure 2G:
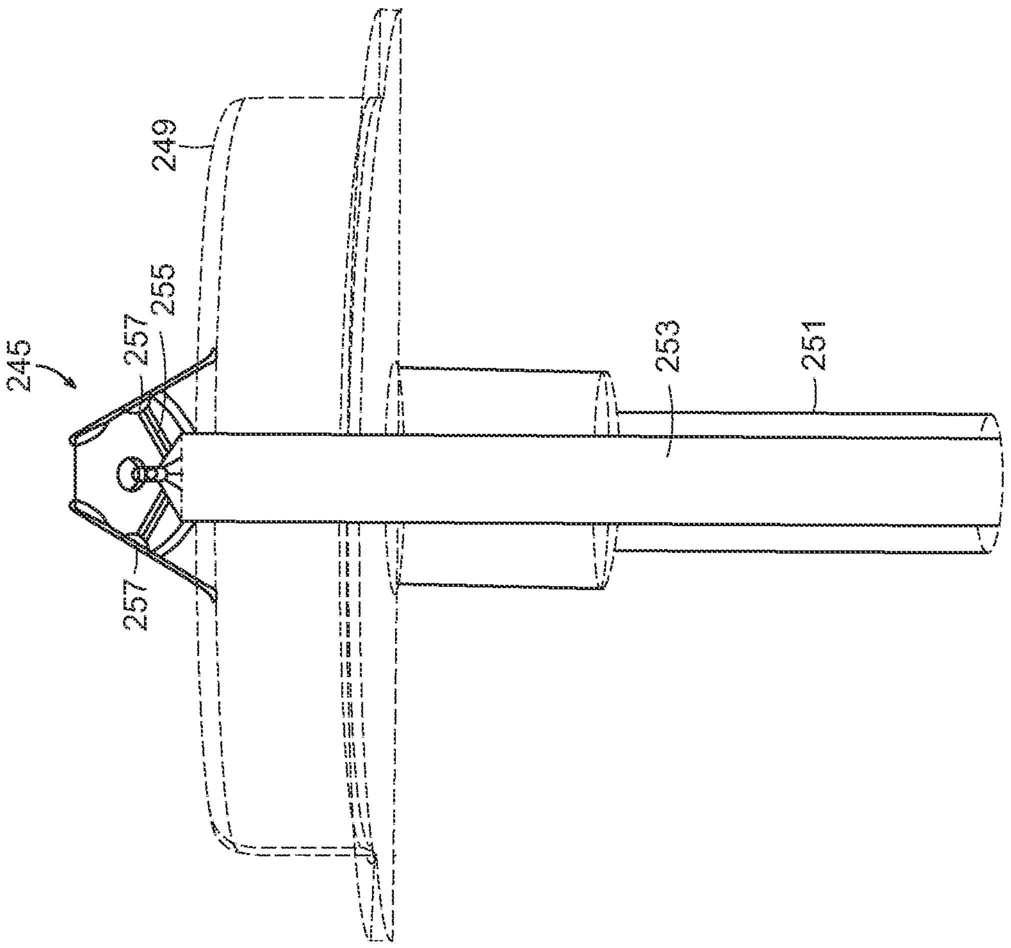
FIG. 2G is a cross-sectional side view of the disk of FIG. 2E.
Figure 2H:
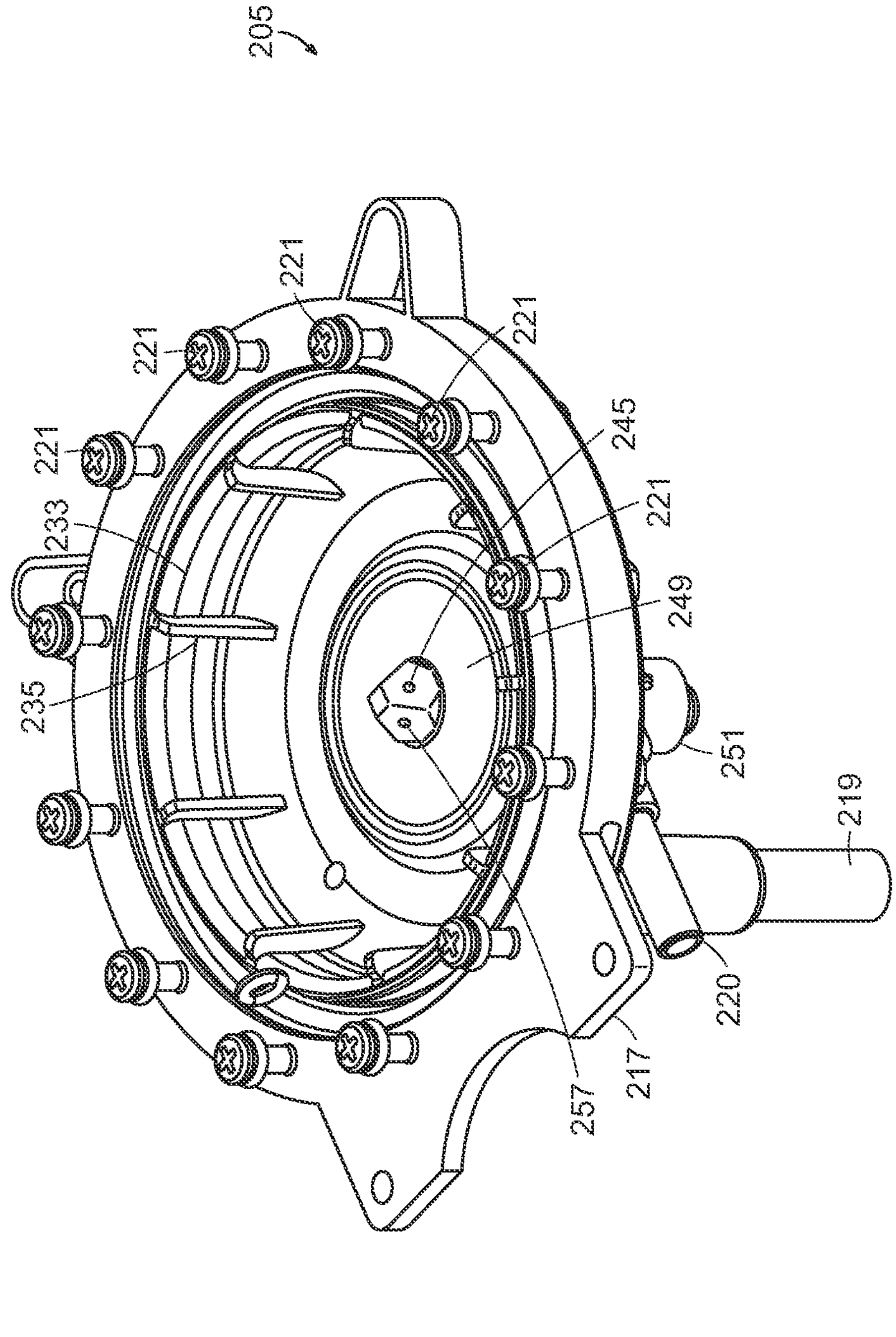
FIG. 2H is a top perspective view of the disk and lower portion of the housing of the carbonation mixing chamber of FIG. 2A.

As shown in FIGS. 2C and 2D the lower portion 205 of the housing includes a substantially circular opening 231 in the bottom wall 233. As shown in FIG. 2H, the opening 231 can be configured to be filled by a disk 241 that is configured to aid in gas delivery into the chamber. As shown in FIGS. 2E-2G the disk 241 can be substantially circular shaped and can have a tab 247 configured to assist in aligning the disk within the opening 231 of the lower portion 205.

The disk 241 can be integrated with a gas inlet pathway A. The gas inlet pathway A can span from a gas source to a gas outlet in the inner chamber. The gas inlet pathway A can be composed of a first end that includes a projection 245 that projects upward from a raised surface 249 of the disk 241 and extends into the inner chamber 240 of the housing. The projection 245 can include a plurality of nozzles or outlets, for example jet nozzles 257. The nozzles 257 can be positioned within the inner chamber 240 and can be configured to direct gas into the chamber, preferably in a plurality of directions that differ from one another. The jet nozzles 257 can be shaped to compress the gas that flows through it in order to create pressure which is then used to propel the gas at high pressures and speed therethrough. Jet nozzles 257 are able to expel gas at high pressures because they include smaller diameter pathways adjacent to the outlet. The smaller diameter pathways serve to compress the fluid or gas traveling through the pathway. Once the gas reaches the outlet, which has a larger diameter, the gas is expelled at high pressures. As shown in FIGS. 2E-2I, in some embodiments, the projection 245 can include four faces each configured to face in a radially outward direction from the center of the disk. Each face can be shaped as a hexagon, pentagon, or any other suitable shape. Each face can include a nozzle 257. Each outlet port or nozzle 257 can be shaped to have a small diameter, such that the gas expelled by the jet nozzle 257 can be released at high velocity.

As illustrated in the cross-sectional view provided in FIG. 2G, the disk 241 can have the gas inlet pathway A with its components integrated within it. The first end of the gas inlet pathway A can end in the projection 245 discussed above. A second end of the gas inlet pathway A can include a tubular member 251 that extends from the housing. The second end with tubular member 251 can be configured to receive gas from a gas source. The interior of the tubular member 251 can include a central fluid flow channel 253 that spans the length of the tubular member 251. The central fluid flow channel 253 can extend upward into the bottom inner surface 236 of the lower portion 205 of the housing 201 and include one or more smaller fluid channels 255 that connect to the outlets 257 on the surface of the projection 245. The smaller fluid channels 255 may have a smaller diameter than the central fluid flow channel 253 such that gas passing through the smaller fluid channel 255 is compressed and then expelled through outlets 257 at high pressures.

Accordingly, in the embodiment illustrated in FIGS. 2A-2K, the outlets or jet nozzles 257 can be configured to inject gas into a liquid at high pressures. For example, gas that travels through the smaller fluid channels 255 experiences higher pressures and compression due to the reduced size of the flow path from the smaller diameter of the smaller fluid channels 255. Accordingly, when the gas is expelled from the outlets 257, the gas is expelled at high pressures. The expelling of gas at high pressures can aid in the mixing of the gas with fluid within the inner chamber.

The nozzles 257 can be positioned at the bottom of the chamber and thus within the fluid such that the gas is injected directly into the fluid. In this manner, the carbonation mixing chamber can be simplified by eliminating the need for a motor and/or whisk.

Figure 2I:
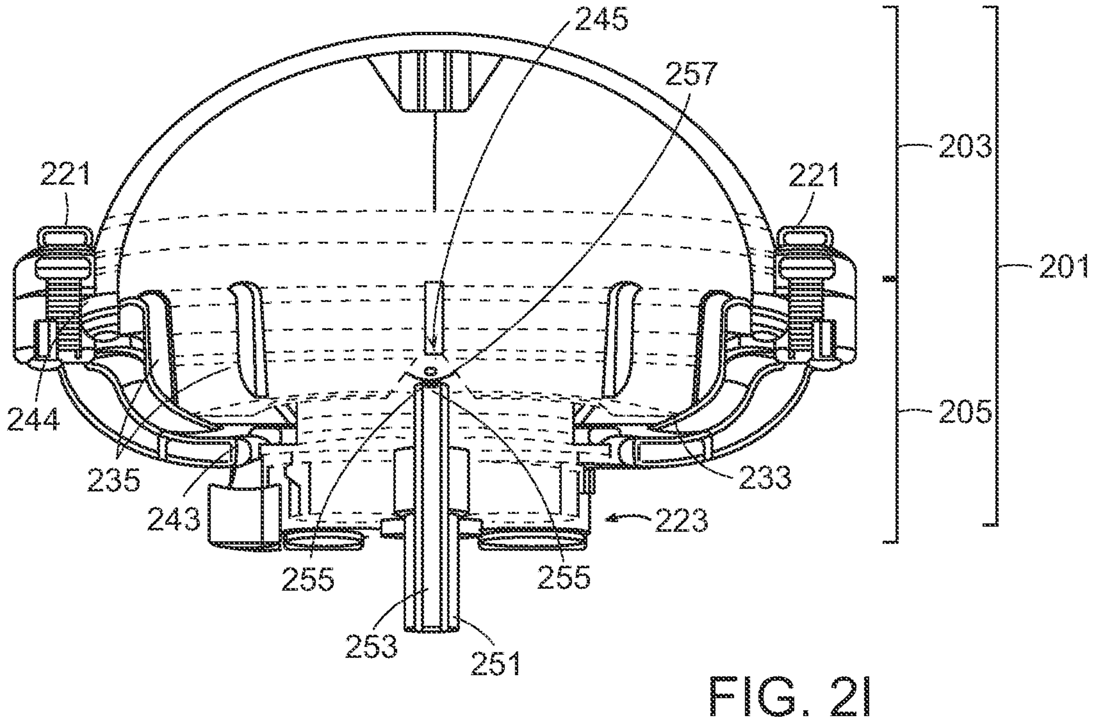
FIG. 2I is a side cross-sectional view of the housing of the carbonation mixing chamber of FIG. 2A.
Figure 2J:
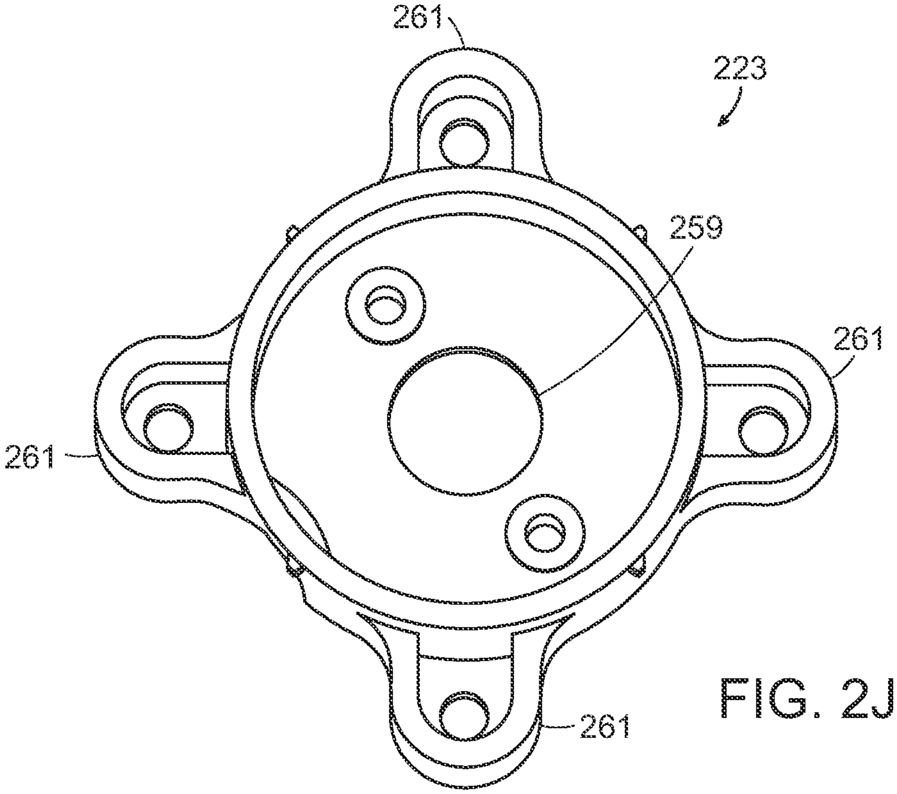
FIG. 2J is a top perspective view of a lower attachment member for use with the carbonation mixing chamber of FIG. 2A.
Figure 2K:
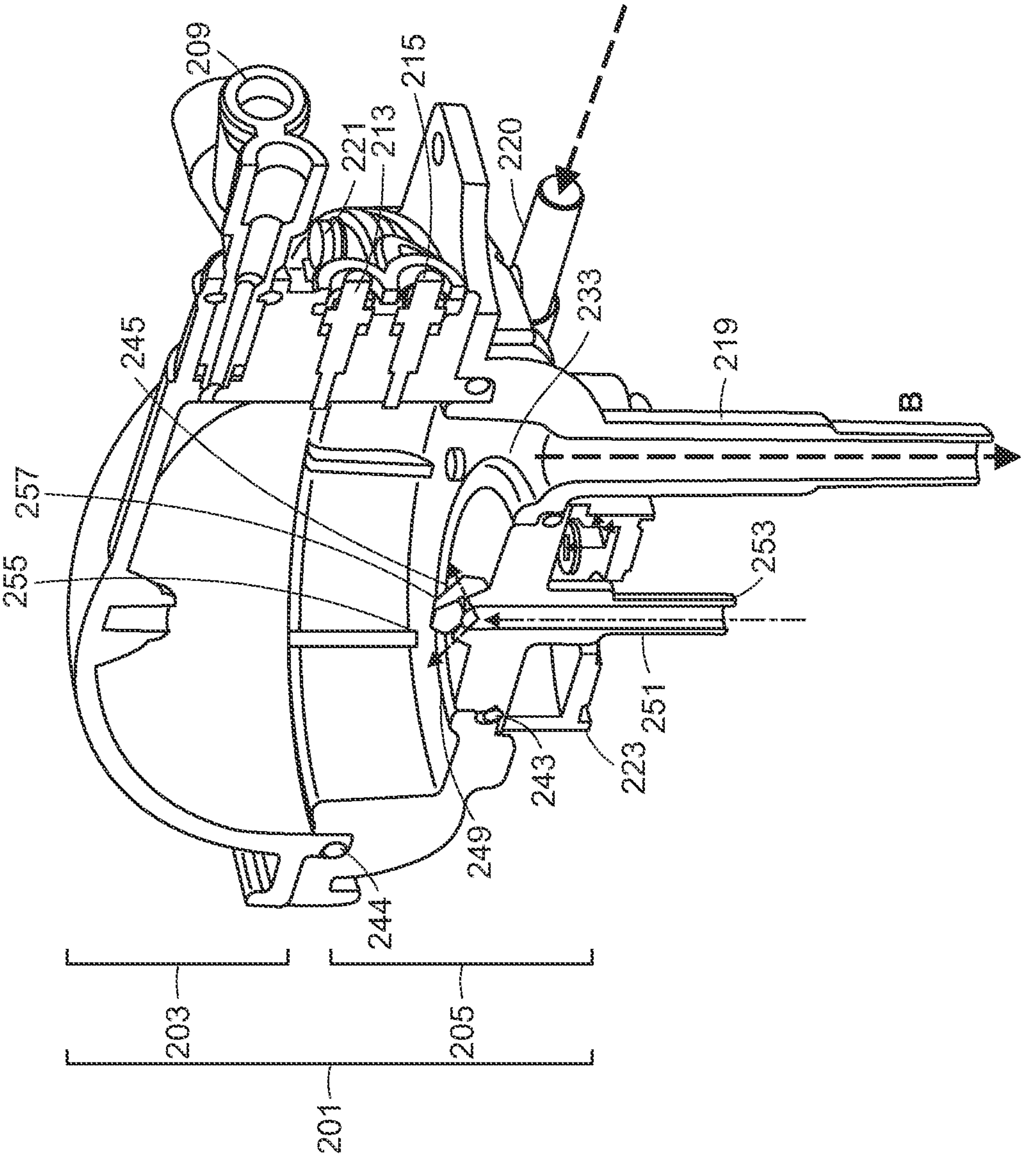
FIG. 2K is a side cross-sectional view of the carbonation mixing chamber of FIG. 2A.

As shown in FIG. 2H, the disk 241 can be placed within the enlarged, substantially circular opening 231 of the lower portion 205 of the housing. A second o-ring 243 can be positioned between the disk 241 and the circular opening 231 in the bottom wall 233 so as to form a fluid seal. As shown in FIGS. 2A, 2I, and 2K, the disk 241 can be further secured to the housing 201 by way of a lower attachment housing 223. The lower attachment housing 223 can be configured to compress the second o-ring 243 between the disk 241 and the circular opening 231 to further aid in the fluid seal between the two.

The lower attachment housing 223 can have any suitable shape. For example, in FIG. 2J a lower attachment housing 223 that is substantially circular with four arms 261 is shown. A central portion of the lower attachment housing 223 may include a circular opening 259 through which the tubular member 251 of the gas inlet pathway A can pass. The lower attachment housing 223 can be attached to the lower portion 205 of the housing 201 by way of screws 225 configured to engage through the arms 261 into receiving elements 263 on the exterior surface 234 of the lower portion 205 of the housing 201.

FIGS. 3A-3H illustrate another embodiment of a carbonation mixing chamber 300 for use with a carbonation system, such as the system 10 shown in FIGS. 1A-1B. The illustrated carbonation mixing chamber 300 can include a housing 301, a gas inlet pathway D, an outlet pathway E, and a fluid inlet pathway F, each of which is described in more detail below.

Analogous to the embodiment illustrated in FIGS. 2A-2K, in FIGS. 3A-3H the carbonation mixing chamber 300 also includes housing 301 with upper portion 303 and lower portion 305. The upper portion 303 and lower portion 305 can be mated to define an inner chamber 340 therein. The upper portion 303 and lower portion 305 can be mated by way of o-ring 344 and screws 321. The upper portion 203 can have a substantially domed hemispheric shape with one flattened side 307 having projections including sensors and valves.

The upper portion 303 of FIGS. 3A-3H can be analogous to the upper portion 203 of the embodiment illustrated in FIGS. 2A-2K, and can also include a flattened side 307 with a burst disk valve 311, pressure release valves 309, upper water sensor 313, and lower water sensor 315. Similarly, the outlet pathway E and the fluid inlet pathway F can be analogous to outlet pathway B and fluid inlet pathway C of FIGS. 2A-2K. The fluid inlet pathway F can include fluid inlet 320. The outlet pathway E can include outlet 319. Additionally, the lower attachment housing 323 can be analogous to lower attachment housing 223 of FIGS. 2A-2K and may be attached to the lower portion 305 by way of screws 334 that aid in compressing a second o-ring 343 positioned between the lower attachment housing 323 and lower portion 305, such that the inner chamber 340 is fluidly sealed.

Figure 3A:
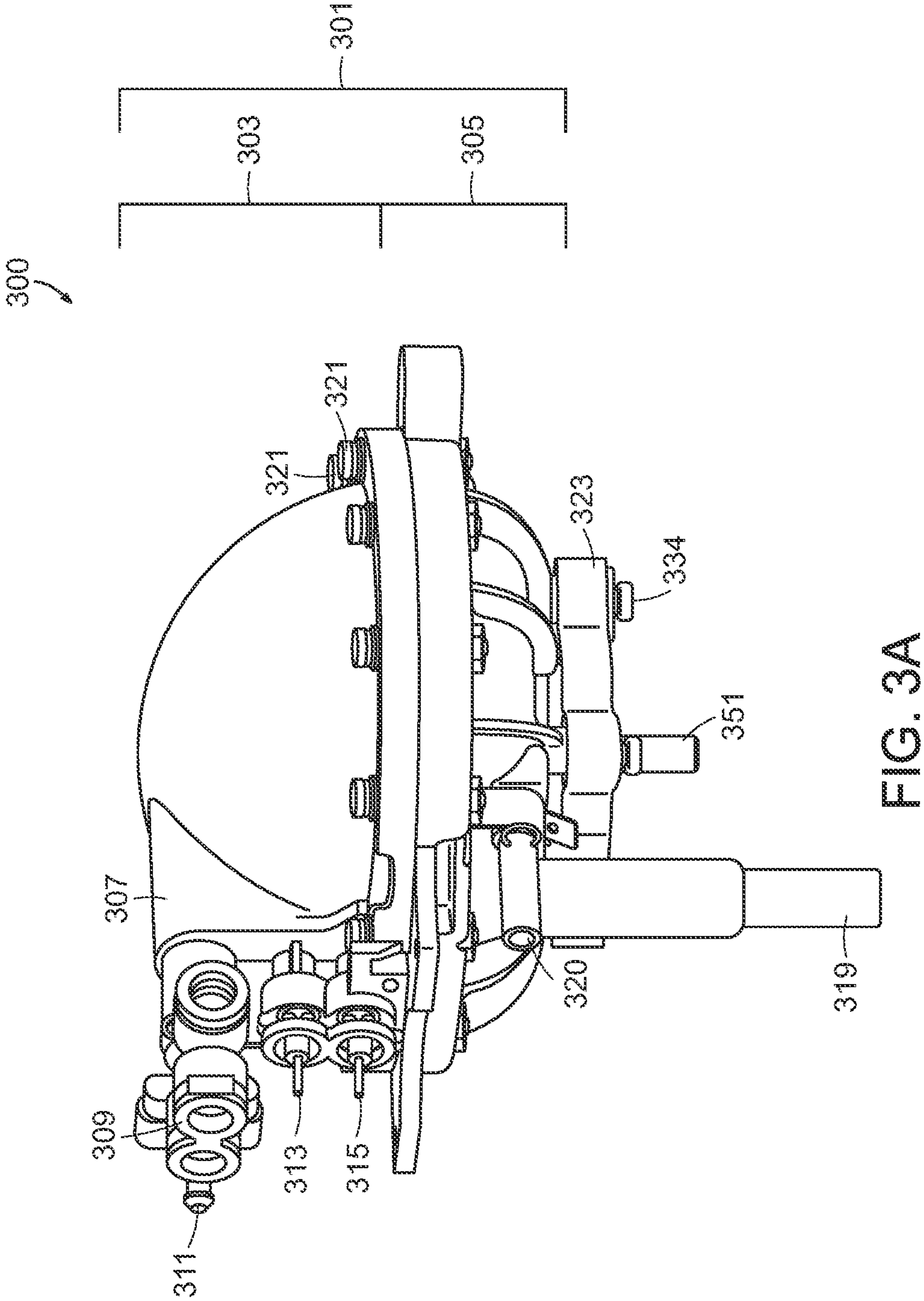
FIG. 3A is a first perspective view of another embodiment of a carbonation mixing chamber for use with a beverage dispensing system.
Figure 3B:
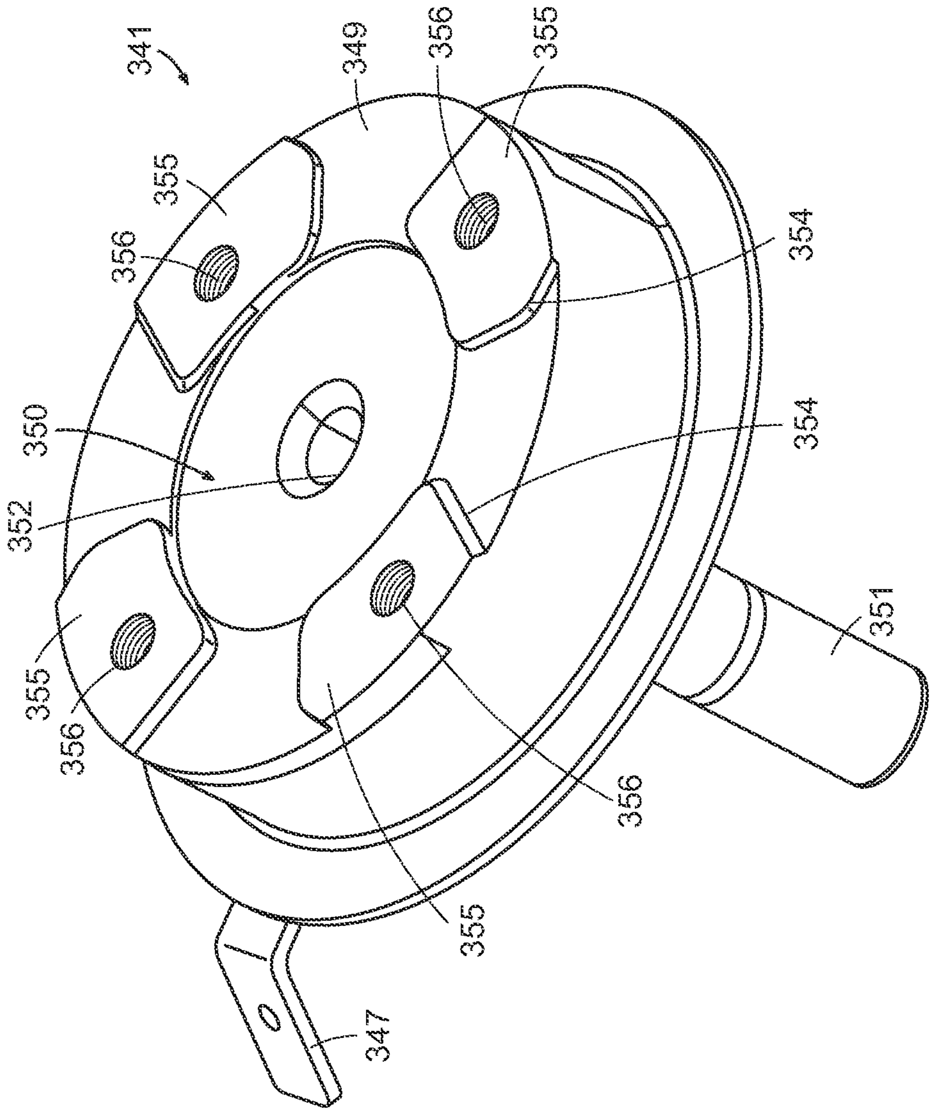
FIG. 3B is a top perspective view of a disk for use with the carbonation mixing chamber of FIG. 3A.
Figure 3C:
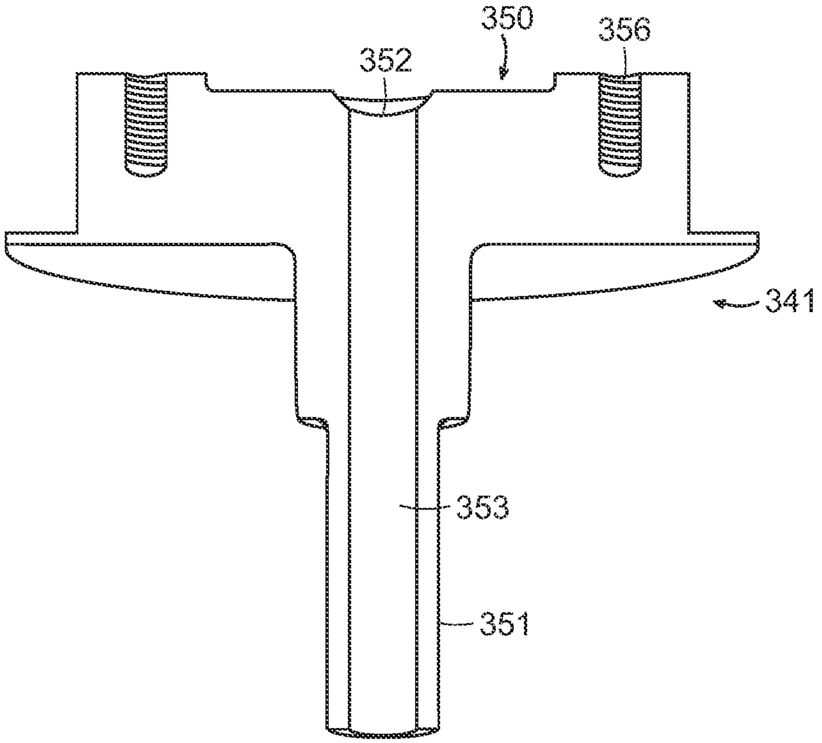
FIG. 3C is a side cross-sectional view of the disk of FIG. 3B.
Figure 3D:
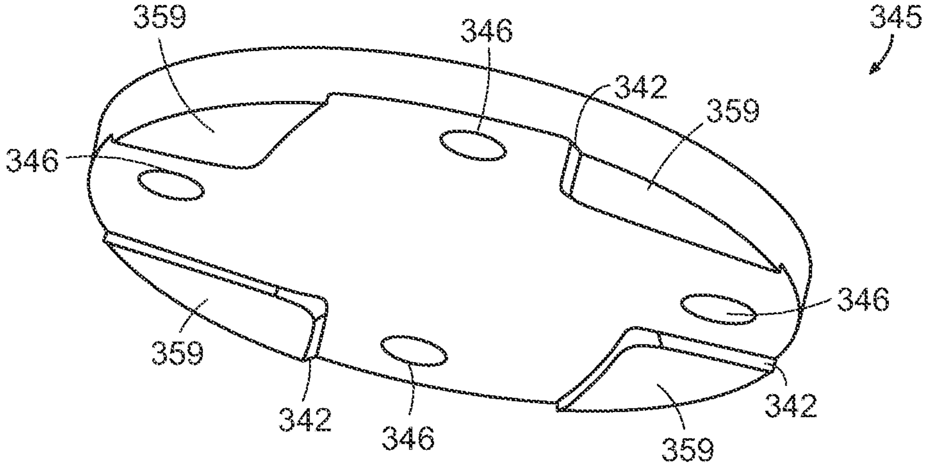
FIG. 3D is a bottom perspective view of a plate for use with the carbonation mixing chamber of FIG. 3A.
Figure 3E:
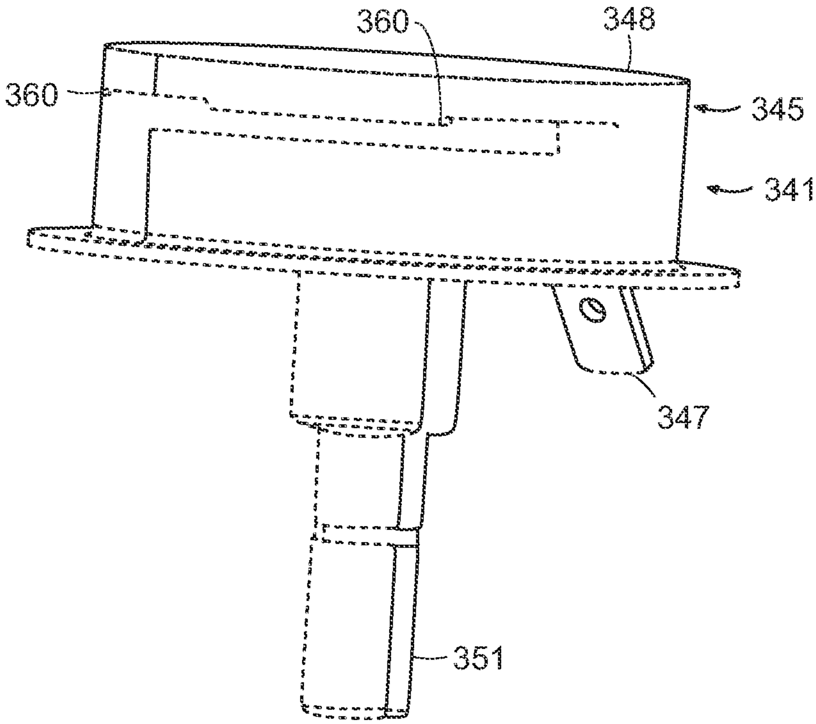
FIG. 3E is a side perspective view of the disk and plate assembly for use with the carbonation mixing chamber of FIG. 3A.
Figure 3F:
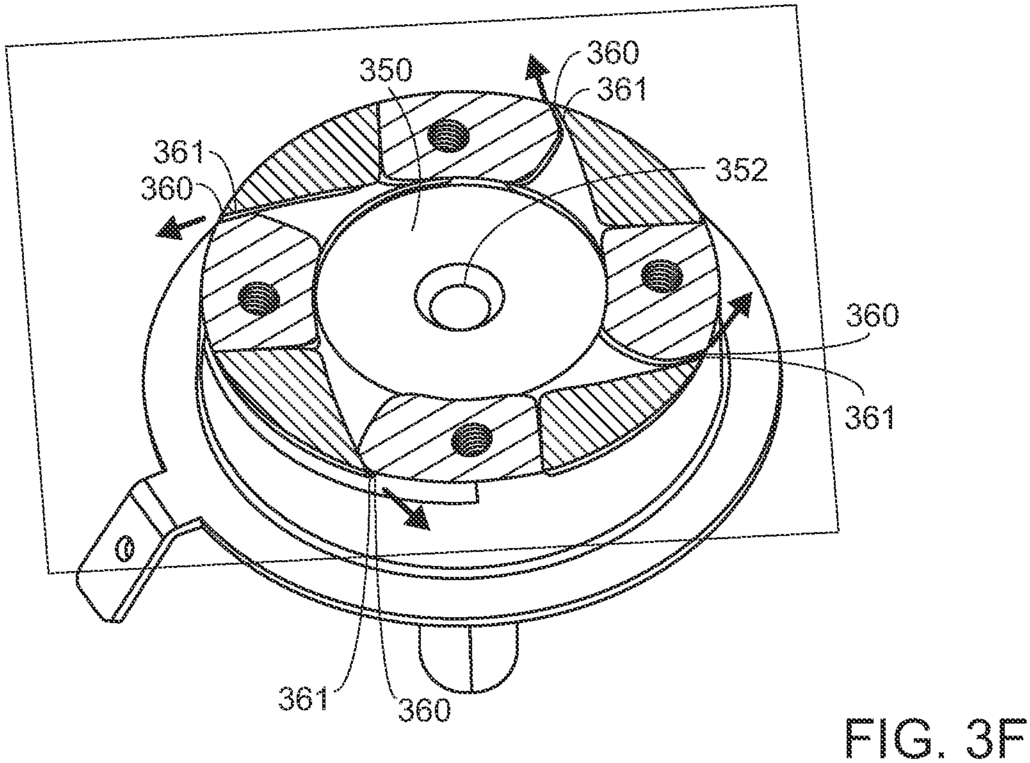
FIG. 3F is a top cross-sectional view of the disk and plate assembly for use with the carbonation mixing chamber of FIG. 3F.
Figure 3G:
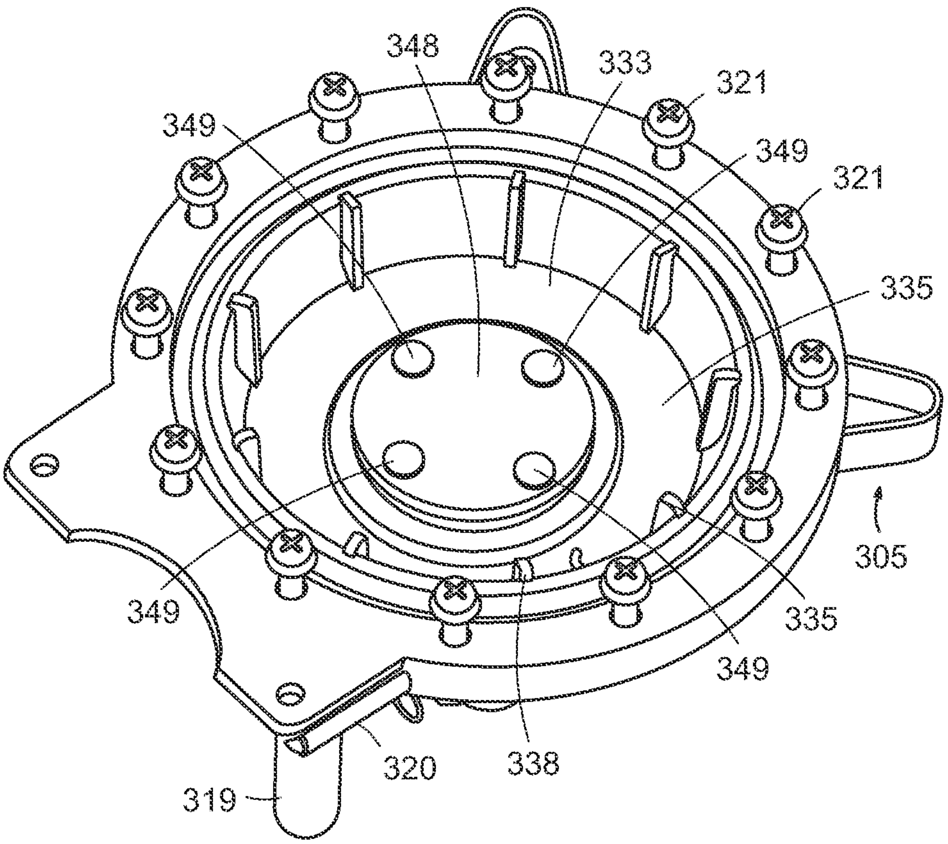
FIG. 3G is a top perspective view of the disk and plate assembly in a lower portion of a housing of the carbonation mixing chamber of FIG. 3A.
Figure 3H:
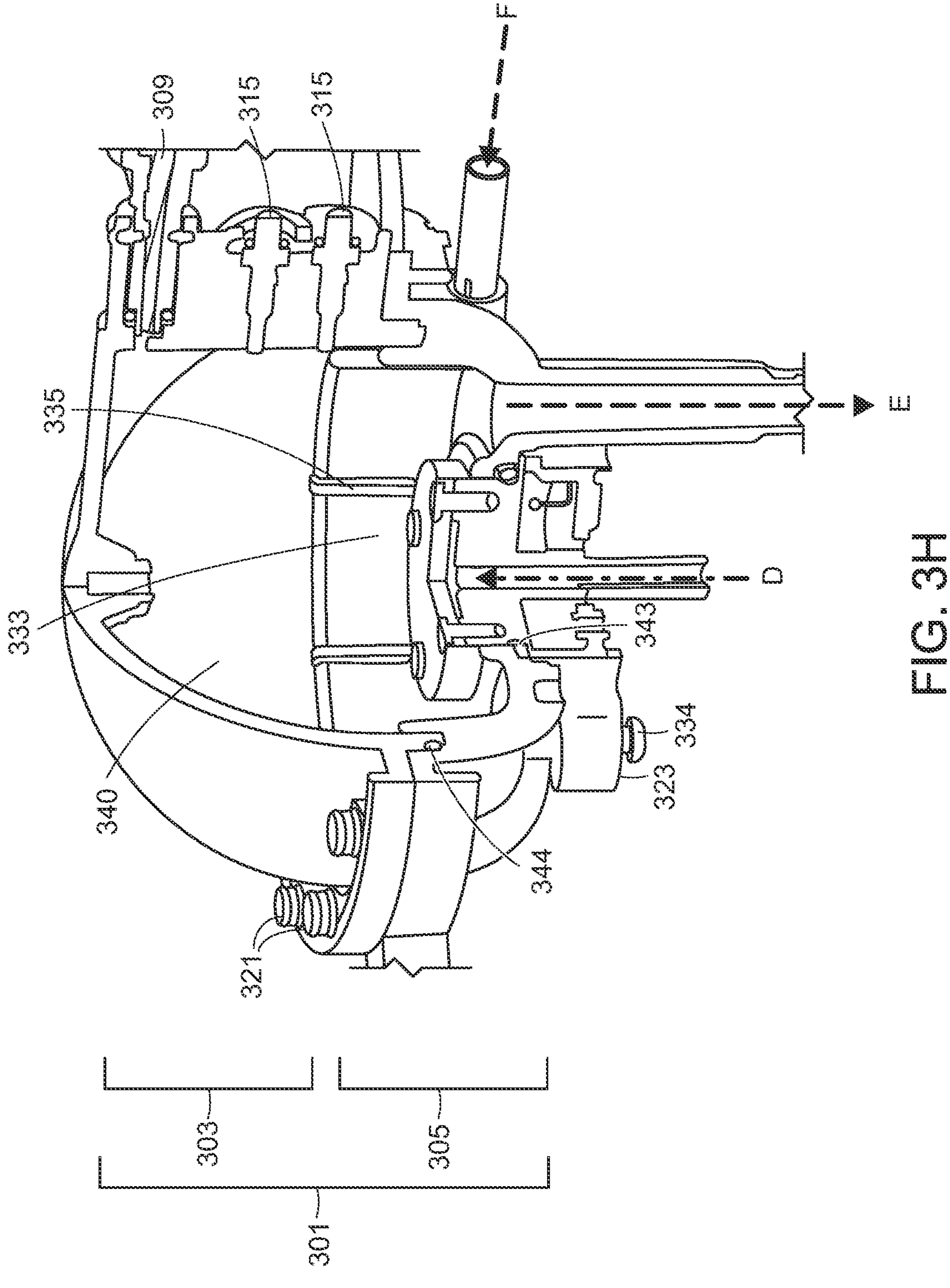
FIG. 3H is a cross-sectional section view of the carbonation mixing chamber of 3A.

As best shown in FIGS. 3A, 3G, and 3H, the lower portion 305 of the housing 301 can be analogous to lower portion 205 of housing 201 of FIGS. 2A-2K. For example, the lower portion 305 includes a bottom wall 333 with an enlarged, substantially circular opening formed therein. The lower portion 305 can have an interior surface with a plurality of ribs 335 positioned thereon.

As shown in FIGS. 3G and 3H, the substantially circular opening of the lower portion 305 can be configured to be filed by a base 341. As shown in FIGS. 3B-3C, 3E-3H, the base 341 can be substantially circular and can include a tab 347 that is configured to align the base 341 within the lower portion 305. The base 341 can be configured to fill the substantially circular opening 331 in the bottom wall of the lower portion 305 of the housing 301. An upper surface 349 of the base 341 can include a circular divot 350 surrounding an opening 352. As best illustrated in FIG. 3C, the opening 352 may be connected to a tubular member 351 that includes a central fluid flow channel 353 and receives gas from a gas source. The base 341 can include raised alignment members 355 that are positioned radially around the upper surface 349. Although four alignment members 355 are shown in FIG. 3B, it is envisioned that any number of alignment members can be positioned along the upper surface 349 of the base 341. The alignment members 355 can include curved side surface walls 354. The alignment members 355 can include holes 356 which can each be threaded to receive a screw to enable the base 341 to be mated to a plate 345.

As best illustrated in FIG. 3D, the plate 345 can be substantially circular in shape and can include a first side configured to engage with the base 341. For example, the first side of the plate 345 can include raised portions 359 that are configured to engage with the upper surface 349 of the base 341 between the alignment members. Further, the first side of the plate 345 can include curved side walls 342 configured to mirror curved side surface walls 354 of the base 341. The first side of the plate 345 can also include holes 346 for receiving screws 336. Screws 336 can be used to attach the plate 345 to the base 341 using holes 346 and 356. As shown in FIGS. 3E and 3G, a second side 348 of the plate 345 can be configured to face the inner chamber 340. When the base 341 is engaged with the plate 345 as illustrated in FIGS. 3E-3H, the curved side walls 342 of the plate 345 and the curved side surface walls 354 of the base 341 form channels 361 from the opening 352 in the base 341 to outlets 360 formed at the intersection of the base 341 and plate 345. As best illustrated in the cross-sectional view of FIG. 3F, the channels 361 may be formed and defined between the intersection of the base 341 and plate 345. The alignment members 355 can have curved side surface walls 354 which move radially outward and then form an angle towards the outlet 360. The curved side surface walls 354 of the base 341 are complementary to the curved side walls 342 of the plate 345, which have a slight curve inward. As the two curves are in opposing directions, there is a space between them when the plate 345 is engaged with the base 341. The resulting space between the curved side walls 342 and the curved side surface walls 345 forms the channels 361 through which gas may travel. In this way, when the two components (i.e., the base 341 and plate 345) are sealed together, gas is forced through the small pathways or channels 361 at high pressures. As such, a high pressure gas jet is delivered into the chamber via outlets 360 as the high pressure gas travels through the channels 361 and is expelled via outlets 360.

Accordingly, components of the base 341 and plate 345 form and define a gas inlet pathway D therebetween. For example, as shown in FIG. 3H, the gas inlet pathway D extends into the inner chamber 340 of the housing 301. The gas inlet pathway D includes tubular member 351 of the base 341 which is configured to receive gas from a gas source (not shown). The gas inlet pathway D also includes a plurality of nozzles or outlets 360 that are positioned within the inner chamber 340. The outlets 360 are formed at the intersection of the base 341 and plate 345. The outlets 360 are configured to direct gas into the inner chamber 340 in a plurality of directions that differ from one another. For example, as shown in FIGS. 3E, 3F, and 3H the illustrated embodiment includes four outlets 360 that are oriented 90 degrees to each other and spaced radially apart. As shown in the cross-sectional view of FIG. 3F, the outlets 360 are positioned at the end of the channels 361 that are formed at the interface of the curved side surface walls 354 and the curved side walls 342. The illustrated embodiment shows a plurality of nozzles, particularly, first, second, third, and fourth nozzles each including a channel 361 and outlet 360. In the illustrated embodiment, the plurality of nozzles can be configured to speed up a flow of gas flowing through the gas inlet pathway D.

The distribution of gas via nozzles positioned as shown in FIGS. 3E-3H can create a spinning motion within the inner chamber, as indicated by the arrows showing the flow path, such that there is greater interaction between gas and liquid molecules and better carbonation of the liquid.

FIGS. 4A-4G illustrate another embodiment of a carbonation mixing chamber 400 for use with a carbonation system, such as the system 10 shown in FIGS. 1A-1B. The illustrated carbonation mixing chamber 400 can include a housing 401, a gas inlet pathway G, an outlet pathway H, and a fluid inlet pathway I, each of which is described in more detail below.

Analogous to the embodiments illustrated in FIGS. 2A-2K and FIGS. 3A-3H, in FIGS. 4A-4G, a carbonation mixing chamber 400 includes housing 401 with upper portion 403 and lower portion 405. The upper portion 403 and lower portion 405 can be mated to define an inner chamber 440 therein. The upper portion 403 and lower portion 405 can be mated by way of o-ring 444 and screws 421. The upper portion 403 can have a substantially domed hemispheric shape with one flattened side 407 having projections including sensors and valves.

Figure 4A:
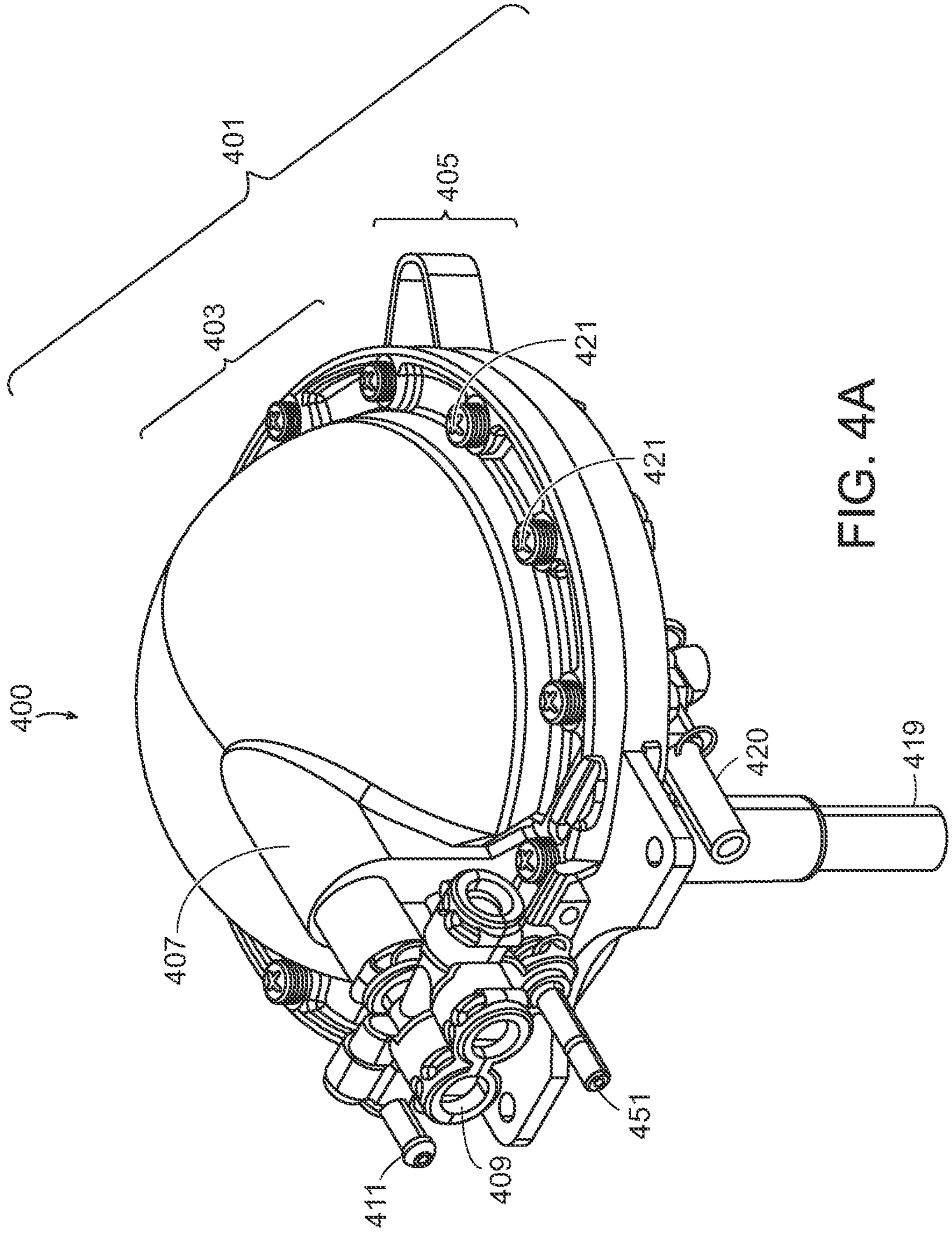
FIG. 4A is a first perspective view of another embodiment of a carbonation mixing chamber for use with a beverage dispensing system.
Figure 4B:
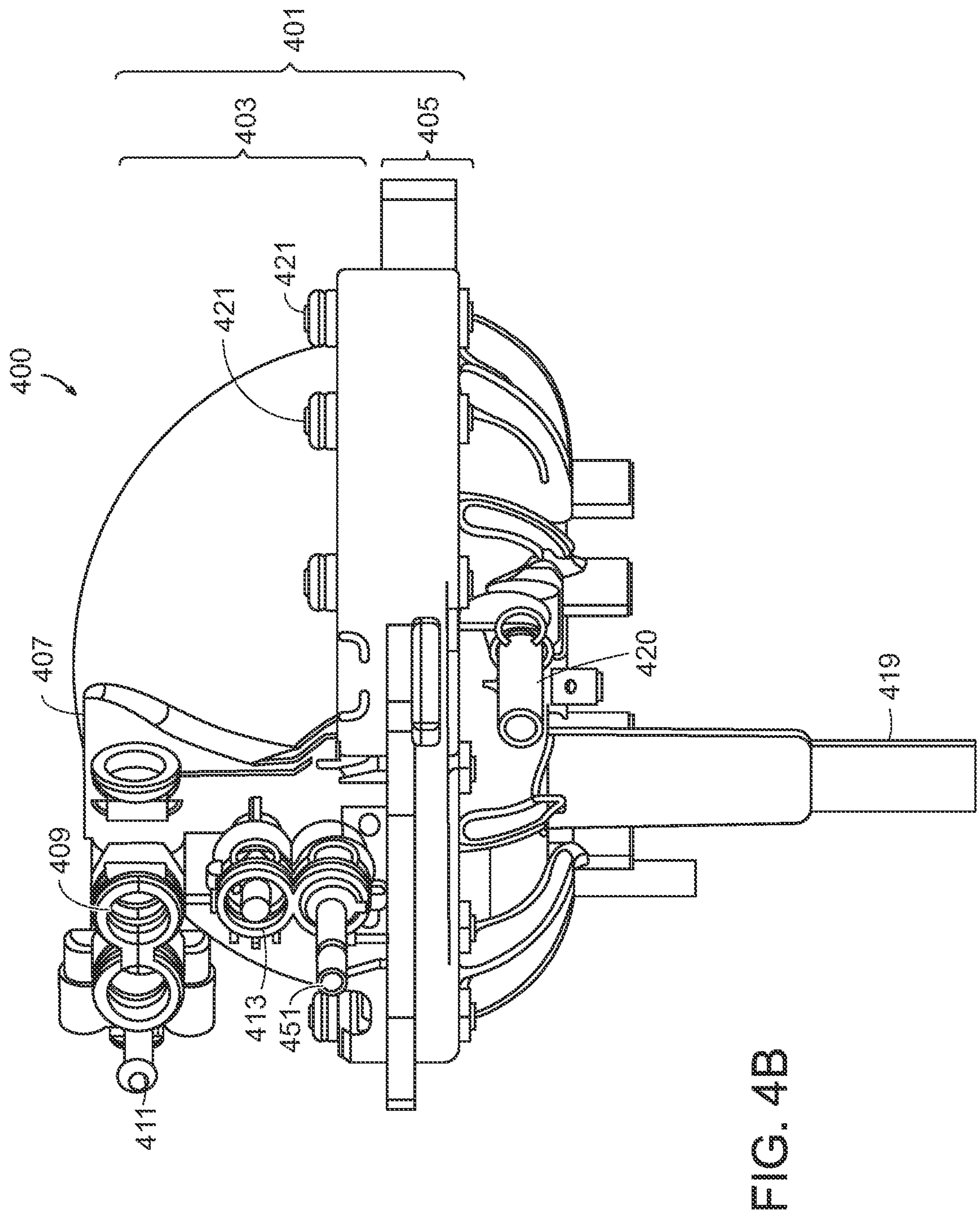
FIG. 4B is a second perspective view of the carbonation mixing chamber of FIG. 4A.

As best illustrated in FIG. 4B, the upper portion 403 has side 407 including a burst disk valve 411, pressure release valves 409, and water sensor 413, analogous to those described with respect to FIGS. 2A-2K and FIGS. 3A-3H.

Figure 4D:
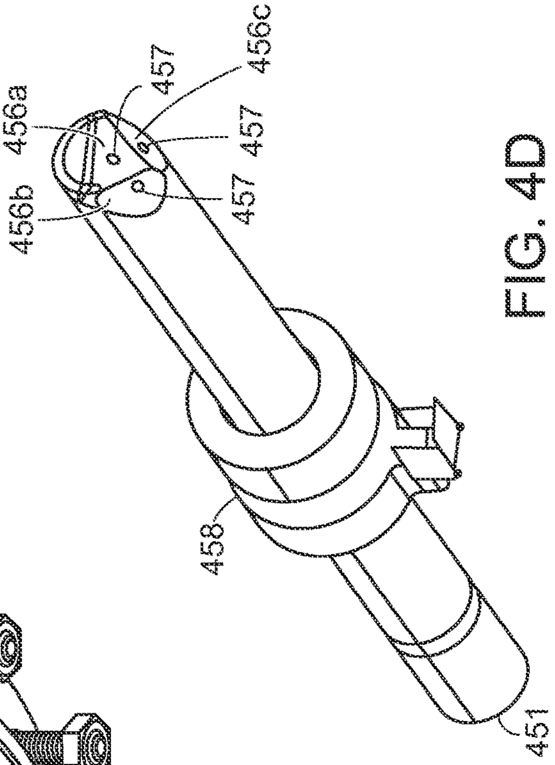
FIG. 4D is a perspective view of a gas injector for use with the carbonation mixing chamber of FIG. 4A.
Figure 4C:
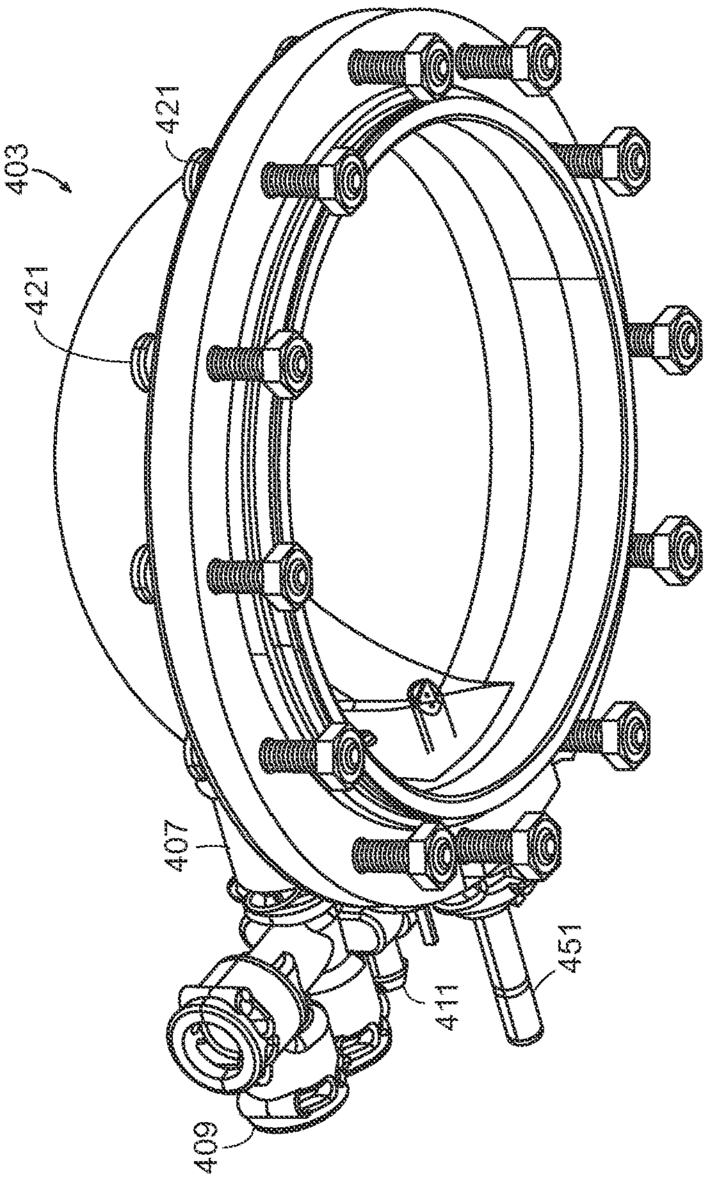
FIG. 4C is a bottom perspective view of an upper portion of a housing of the carbonation mixing chamber of FIG. 4A.

As best illustrated in FIGS. 4B-4C, the upper portion also includes a gas injector 451. The gas injector 451 of FIG. 4D can form a gas inlet pathway G and include a substantially cylindrical tubular structure that has a first end that is configured to receive gas from a source (not shown). The gas injector 451 may extend through a sidewall of the upper housing 403. As shown, the gas injector can include housing attachment members 458 configured to engage with the sidewall of the upper housing. The housing attachment members 458 can be positioned approximately midway along the length of the gas injector 451. The housing attachment members 458 can be configured to prevent the gas injector 451 from moving with respect to the sidewall of the upper housing 403. Although the housing attachment members 458 are shown as cylindrical clamps other shapes may also be used. The gas injector 451 may include a central lumen spanning the length of the tubular structure. The central lumen may be configured on the interior of the gas injector 451 and be configured to transport gas.

Figure 4E:
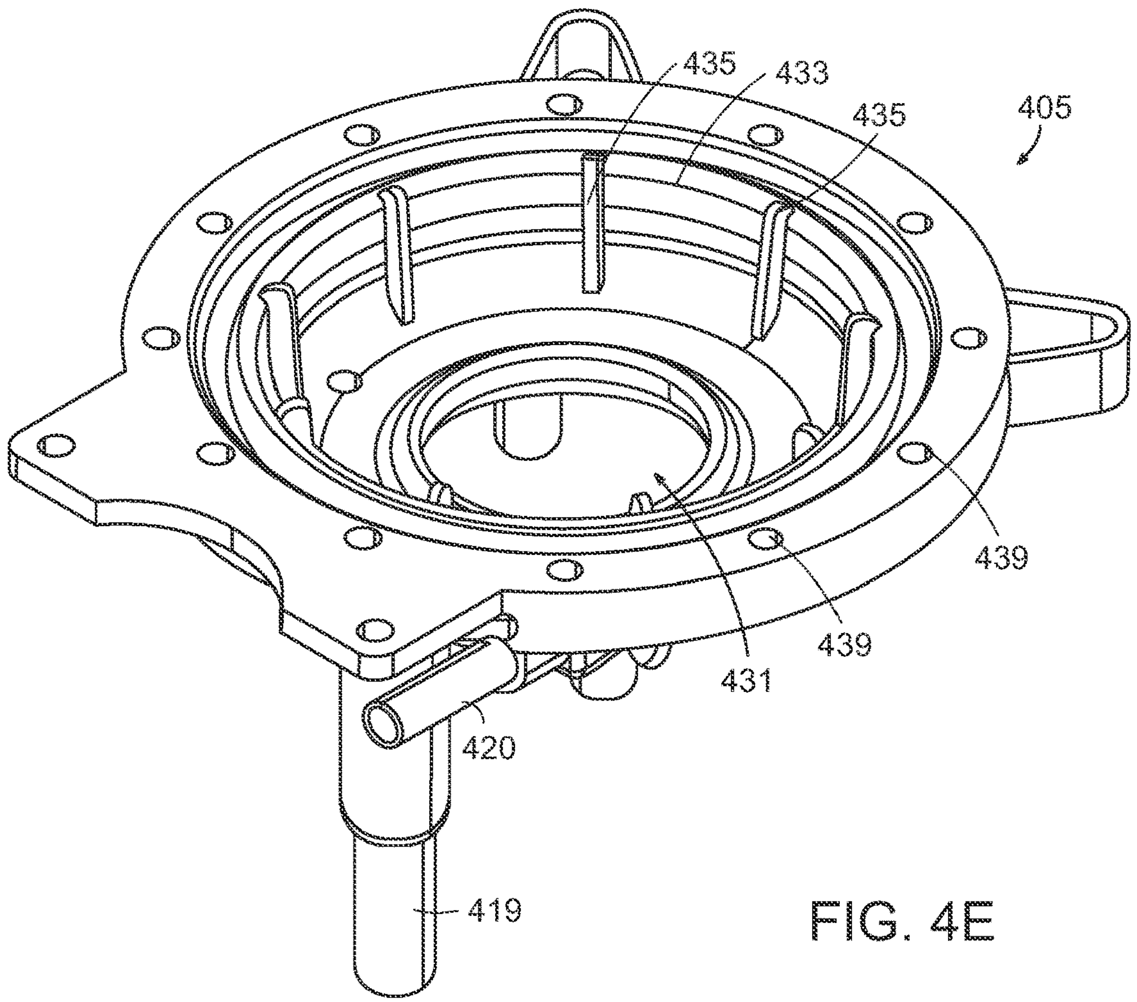
FIG. 4E is a top perspective view of a lower portion of a housing of the carbonation mixing chamber of FIG. 4A.
Figure 4F:
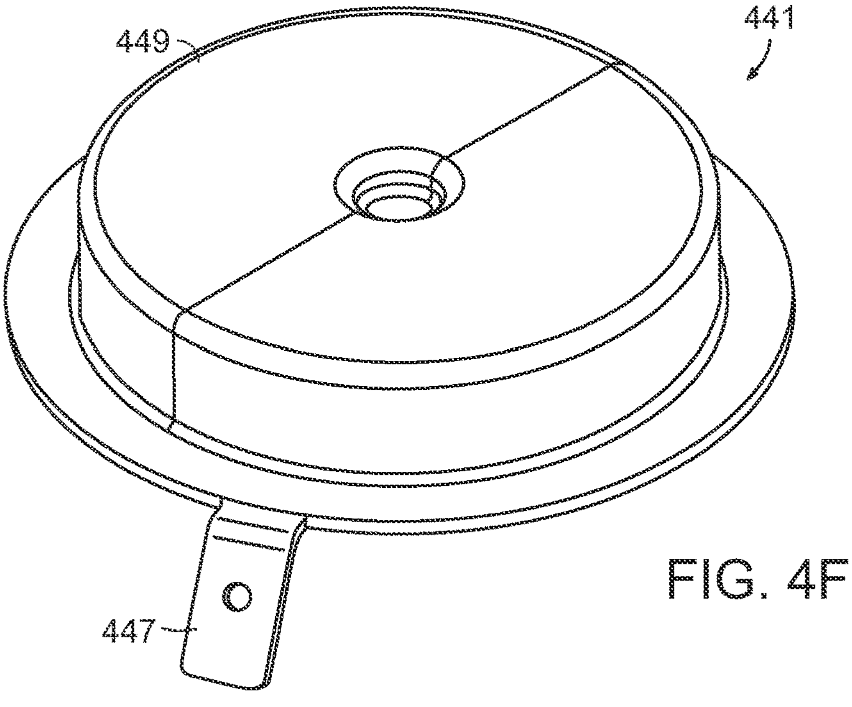
FIG. 4F a top perspective view of a disk for use with the carbonation mixing chamber of FIG. 4A.
Figure 4G:
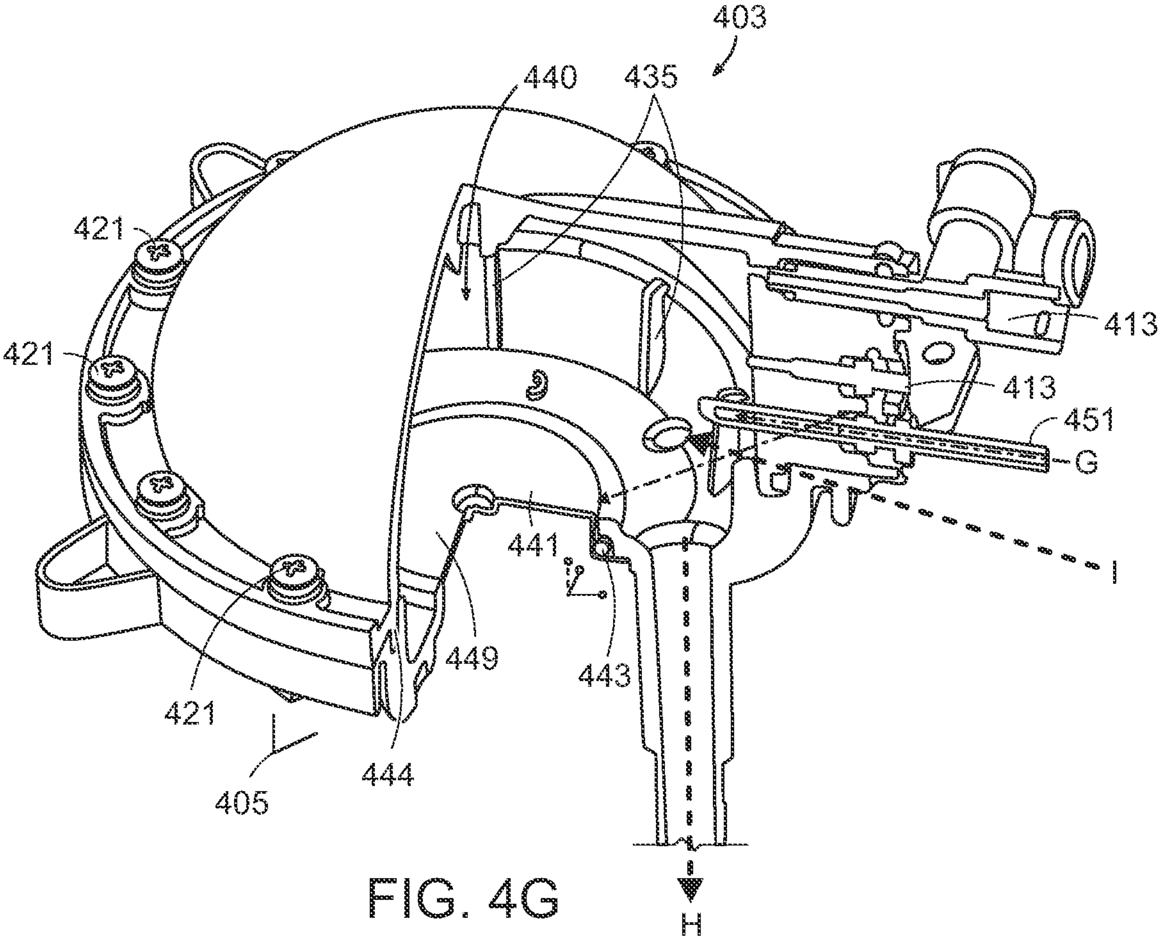
FIG. 4G is a cross-sectional section view of the carbonation mixing chamber of 4A.

The upper portion 403 of FIG. 4B can be attached to a lower portion 405 to form an inner chamber 440 therebetween. A first o-ring 444 can be positioned between the upper portion 403 and lower portion 405 in order to fluidly seal the inner chamber 440. As illustrated in FIG. 4E, lower portion 405 can be analogous to lower portion 305 of FIGS. 3A-3H and lower portion 205 of FIGS. 2A-2K. For example, lower portion 405 includes bottom wall 433 with an enlarged, substantially circular opening 431 formed therein. The interior surface of the lower portion 405 may include a plurality of ribs 435 to aid in the mixing of liquid and gas. The lower portion 405 may also include a fluid inlet pathway I and fluid outlet pathway H. The fluid inlet pathway I can include a fluid inlet 420 including a tubular member that is configured to receive fluid from a fluid reservoir and deposit the received fluid into the inner chamber 440. The fluid outlet pathway H includes fluid outlet 419 that includes a tubular member that is configured to expel fluid from the inner chamber 440.

As shown in FIG. 4D, a second end of the gas injector 451 may terminate in a plurality of nozzles. For example, the second end of the gas injector 451 may have a plurality of faces 456*a*, 456*b*, and 456*c* (collectively, 456) positioned transverse to each other. For example, a first face 456*a* may be oriented along a longitudinal axis of the lumen in the tubular member. A second face 456*b* may be oriented along an axis that extends transverse to the longitudinal axis and intersects the first face. A third face 456*c* may also be oriented along an axis that extends transverse to the longitudinal axis and intersect with the first face 456*a* and the second face 456*b*. Although a gas injector 451 with three faces is illustrated in FIG. 4D, it is envisioned that the gas injector may include any number of suitable faces oriented towards where the liquid is located in the inner chamber. Outlet ports 457 may be positioned on each of the first, second, and third faces. The outlet ports 457 can be configured to expel gas at high pressures in a generally downward direction from the gas injector 451. As shown best in FIGS. 4A-4C and 4G, the gas injector 451 may be positioned below the water sensor 413 such that the gas is injected into the inner chamber 440 below the liquid level. In this manner, gas may be injected into the liquid at high velocities thereby aiding in the carbonation of the liquid.

Figure 5:
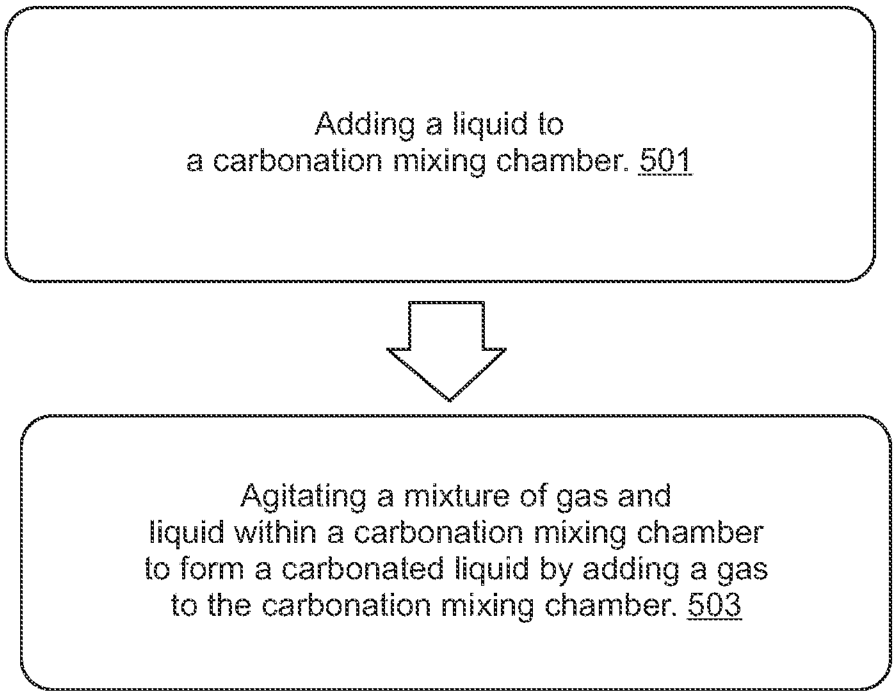
FIG. 5 is a flow-chart showing one embodiment of a process for using a carbonation mixing chamber.

FIG. 5 illustrates a method for utilizing a carbonation mixing chamber such as carbonation mixing chambers 200, 300 or 400. In step 501, a liquid can be added to the carbonation mixing chamber. In a second step 503, a gas can be added to the carbonation mixing chamber. In some embodiments, the liquid can be added before the gas. In some embodiments, the gas can be added to the chamber before the liquid. In some embodiments, the gas and the liquid can be added to the inner chamber simultaneously. The introduction of gas into the chamber may cause the gas and liquid in the chamber to mix, as described herein, such that the gas dissolves in the liquid.

In some embodiments, the inner chamber can be filled with a liquid (e.g., water). Once the liquid reaches the first sensor, a warning can be sent to a processor. Once the liquid reaches a second top sensor, the processor can be sent a signal to stop filling the inner chamber with liquid. The processor can also be sent a signal to inject a gas (e.g., carbon dioxide). The gas can be injected until a target pressure (e.g., 1.65 MPa) is reached. The injection of gas into the chamber below the liquid line may expose the gas to as much liquid as possible in accordance with the systems and methods described herein.

The injection of gas into the inner chamber can be activated in any number of ways. For example, the gas injector and related valves can be activated automatically (e.g., by a microcontroller or other processor of the carbonation system) after the liquid is added to the chamber. The injection of gas into the chamber can be stopped and re-started as needed to achieve the required pressure, agitation and to meet the time scale as determined by a user or program. The carbonated fluid can be dispensed from the chamber to a container (e.g., a cup, a bottle, etc.) through an outlet valve in fluid communication with the chamber.

Certain illustrative implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting illustrative implementations and that the scope of the present invention is defined solely by the claims. The features illustrated or described in connection with one illustrative implementation can be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, can be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language can correspond to the precision of an instrument for measuring the value. Here and throughout the specification and claims, range limitations can be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. A carbonation mixing chamber, comprising:
a housing having an inner chamber;
a fluid inlet pathway extending into the inner chamber at one of a top or a side of the housing and configured to receive fluid from a fluid source;
a gas inlet pathway extending into the inner chamber of the housing and configured to receive gas from a gas source, the gas inlet pathway having a plurality of nozzles positioned at a bottom of the inner chamber and configured to direct gas in a plurality of directions that differ from one another; and
an outlet pathway in the housing configured to dispense a mixture of fluid and gas from the inner chamber.

2. The carbonation mixing chamber of claim 1, wherein the plurality of nozzles are configured to speed up a flow of gas flowing through the gas inlet pathway.

3. The carbonation mixing chamber of claim 1, wherein the gas inlet pathway comprises a tube having a terminal end with the plurality of nozzles formed in the terminal end.

4. The carbonation mixing chamber of claim 1, wherein at least one of the plurality of nozzles comprises a projection extending upward from a bottom inner surface of the housing and having a plurality of fluid flow channels therethrough.

5. The carbonation mixing chamber of claim 4, wherein the plurality of fluid flow channels in the projection extend radially outward from a central fluid flow channel formed in a tubular member extending from the housing.

6. The carbonation mixing chamber of claim 1, wherein the gas inlet pathway comprises a tubular member extending through a sidewall of the housing and defining a lumen therethrough, and wherein the plurality of nozzles comprise a plurality of outlet ports formed in a terminal end of the tubular member.

7. The carbonation mixing chamber of claim 6, wherein the plurality of outlet ports comprise a first outlet port oriented along a longitudinal axis of the lumen in the tubular member, a second outlet port oriented along an axis extending transverse to the longitudinal axis and intersecting a base of the housing, and a third outlet port oriented along a second axis extending transverse to the longitudinal axis and intersecting the base of the housing.

8. A carbonation system comprising the carbonation mixing chamber of claim 1.

9. The carbonation mixing chamber of claim 2, wherein at least one nozzle of the plurality of nozzles comprises a pathway adjacent to an outlet of the at least one nozzle, wherein the pathway has a smaller diameter than the outlet.

10. The carbonation mixing chamber of claim 1, wherein the plurality of nozzles are configured to speed up a flow of gas flowing through the gas inlet pathway.

11. A carbonation mixing chamber comprising:

a housing having an inner chamber;

a fluid inlet pathway extending into the inner chamber of the housing and configured to receive fluid from a fluid source;

gas inlet pathway extending into the inner chamber of the housing and configured to receive gas from a gas source, the gas inlet pathway having a plurality of nozzles positioned within the inner chamber and configured to direct gas in a plurality of directions that differ from one another; and an outlet pathway in the housing configured to dispense a mixture of fluid and gas from the toner chamber;

wherein the housing includes a base having a plate disposed on the base and within the inner chamber, the plate and the base defining the gas inlet pathway therebetween.

12. The carbonation mixing chamber of claim 11, further comprising a tube extending from the base and configured to couple to a gas source and to deliver gas to the inlet pathway between the base and the plate.

13. The carbonation mixing chamber of claim 11, wherein the plurality of nozzles comprises first, second, third, and fourth nozzles formed between the plate and the base.

14. The carbonation mixing chamber of claim 11, wherein the plurality of nozzles comprises channels formed between the plate and the base.

15. The carbonation mixing chamber of claim 14, wherein the channels are configured to speed up a flow of gas flowing through the channels.

16. The carbonation mixing chamber of claim 15, wherein terminal ends of the channels form outlets configured to expel the gas into the carbonation mixing chamber.

17. A carbonation system comprising the carbonation mixing chamber of claim 11.

18. A carbonation mixing chamber comprising:

a housing having an upper portion and a lower portion mated to one another to define an inner chamber therein;

a fluid inlet pathway extending into the inner chamber of the housing and configured to receive fluid from a fluid source;

a gas inlet pathway extending into the inner chamber of the housing and configured to receive gas from a gas source the gas inlet pathway having a plurality of nozzles positioned within the inner chamber and configured to direct gas in a plurality of directions that differ from one another; and an outlet pathway in the housing configured to dispense a mixture of fluid and gas from the inner chamber.

19. A carbonation system comprising the carbonation mixing chamber of claim 18.

* * * * *